(12) United States Patent
Bando et al.

(10) Patent No.: US 10,784,808 B2
(45) Date of Patent: Sep. 22, 2020

(54) VARIABLE SPEED GENERATOR-MOTOR APPARATUS AND VARIABLE SPEED GENERATOR-MOTOR SYSTEM

(71) Applicant: HITACHI MITSUBISHI HYDRO CORPORATION, Tokyo (JP)

(72) Inventors: Akira Bando, Tokyo (JP); Osamu Nagura, Tokyo (JP)

(73) Assignee: HITACHI MITSUBISHI HYDRO CORPORATION, Tokyo (JP)

( * ) Notice: Subject to any disclaimer, the term of this patent is extended or adjusted under 35 U.S.C. 154(b) by 0 days.

(21) Appl. No.: 16/707,629

(22) Filed: Dec. 9, 2019

(65) Prior Publication Data

US 2020/0144949 A1    May 7, 2020

Related U.S. Application Data

(62) Division of application No. 15/553,062, filed as application No. PCT/JP2016/055119 on Feb. 22, 2016, now Pat. No. 10,536,104.

(51) Int. Cl.
*H02P 25/024* (2016.01)
*H02P 1/50* (2006.01)
(Continued)

(52) U.S. Cl.
CPC ............ *H02P 25/024* (2016.02); *H02M 7/48* (2013.01); *H02M 7/49* (2013.01); *H02P 1/50* (2013.01);
(Continued)

(58) Field of Classification Search
CPC .... H02P 25/24; H02P 1/50; H02P 9/04; H02P 25/18; H02P 27/06; H02M 7/48;
(Continued)

(56) References Cited

U.S. PATENT DOCUMENTS 1,359,687 A * 11/1920 Fynn .................... H02P 9/00
                                                              322/20
4,743,828 A   5/1988  Jahns et al.
(Continued)

FOREIGN PATENT DOCUMENTS

CN    102597489 A    7/2012
EP    2383881 A1    11/2011
(Continued)

OTHER PUBLICATIONS

Makoto Hagiwara et al., "A Medium-Voltage Motor Drive with a Modular Multilevel PWM Inverter Part I. Experimental Verification by a 400-V, 15-kW Downscaled Model," IEEJ IA vol. 130, No. 4, pp. 544-551 (2010).

(Continued)

*Primary Examiner* — Jorge L Carrasquillo
*Assistant Examiner* — Devon A Joseph
(74) *Attorney, Agent, or Firm* — McDermott Will & Emery LLP

(57) ABSTRACT

In a variable speed generator-motor apparatus, a power converter includes six two-terminal arms each formed by serially connecting k unit converters that can output arbitrary voltage, an AC rotating electric machine includes an armature winding with 60-degree phase zone formed from a double layer coil, the armature winding being divided into first and second pole sides to form double star connection by binding neutral points and to be drawn out as two sets of three-phase terminals; three-phase terminals on the first pole side are connected to first terminals of three arms, and second terminals of the three arms are star-connected to a first terminal of a DC power supply; three-phase terminals on the second pole side are connected to second terminals of remaining three arms, and first terminals of the three arms (Continued)

are star-connected to a second terminal of the DC power supply.

1 Claim, 23 Drawing Sheets

(51) Int. Cl.
*H02M 7/49* (2007.01)
*H02M 7/48* (2007.01)
*H02P 25/18* (2006.01)
*H02P 27/06* (2006.01)
*H02P 9/04* (2006.01)
*H02M 7/483* (2007.01)
*H02M 1/12* (2006.01)

(52) U.S. Cl.
CPC ............... *H02P 9/04* (2013.01); *H02P 25/18* (2013.01); *H02P 27/06* (2013.01); *H02M 2001/123* (2013.01); *H02M 2007/4835* (2013.01); *Y02E 10/725* (2013.01)

(58) Field of Classification Search
CPC ............. H02M 7/49; H02M 2001/123; H02M 2007/4835; Y02E 10/725
See application file for complete search history.

(56) References Cited

U.S. PATENT DOCUMENTS

| | | | | |
|---|---|---|---|---|
| 5,825,152 | A * | 10/1998 | Eriksson | H02P 25/024 318/700 |
| 8,796,871 | B2 | 8/2014 | De Wergifosse | |
| 9,641,034 | B2 * | 5/2017 | Ito | H02K 3/12 |
| 9,912,206 | B2 * | 3/2018 | Grand | H02K 1/16 |
| 2003/0155884 | A1 | 8/2003 | Witzig | H02P 6/16 318/700 |
| 2005/0062356 | A1 * | 3/2005 | Hoppe | H02K 41/031 310/183 |
| 2005/0093521 | A1 * | 5/2005 | Nishimura | H02K 3/28 322/32 |
| 2010/0118578 | A1 | 5/2010 | Dommaschk et al. | |
| 2010/0219788 | A1 * | 9/2010 | Edelson | H02K 3/28 318/801 |
| 2010/0231150 | A1 * | 9/2010 | Tan | H02M 7/49 318/400.3 |
| 2011/0069517 | A1 | 3/2011 | Asplund | |
| 2012/0026767 | A1 * | 2/2012 | Inoue | H02M 7/217 363/89 |
| 2012/0113699 | A1 * | 5/2012 | Crookes | H02M 7/483 363/126 |
| 2012/0211981 | A1 * | 8/2012 | De Wergifosse | H02P 9/08 290/31 |
| 2013/0208519 | A1 | 8/2013 | Yamamoto et al. | |
| 2014/0169048 | A1 | 6/2014 | Inoue et al. | |
| 2014/0265994 | A1 | 9/2014 | Mao | |
| 2015/0008859 | A1 * | 1/2015 | Inoue, I | H02M 7/483 318/496 |
| 2015/0256081 | A1 * | 9/2015 | Bakran | H02M 3/33584 363/21.01 |
| 2016/0301348 | A1 * | 10/2016 | Mao | H02P 25/22 |
| 2016/0365807 | A1 | 12/2016 | Inoue et al. | |

FOREIGN PATENT DOCUMENTS

| | | |
|---|---|---|
| EP | 2549634 A1 | 1/2013 |
| EP | 2608392 A1 | 6/2013 |
| EP | 2806552 A1 | 11/2014 |
| EP | 2 822 168 A2 | 1/2015 |
| FR | 2 869 478 A1 | 10/2005 |
| JP | 10-323052 A | 12/1998 |
| JP | 2010-068677 A | 3/2010 |
| JP | 2010233411 A | 10/2010 |
| JP | 5189105 B2 | 4/2013 |
| JP | 2013-162735 A | 8/2013 |
| JP | 5268739 B2 | 8/2013 |
| JP | 2013-255422 A | 12/2013 |
| JP | 5537095 B2 | 7/2014 |
| WO | 2009-135523 A1 | 11/2009 |

OTHER PUBLICATIONS

Philip L. Alger, "Induction Machines," Second Edition, p. 77 (Fig. 3.3); p. 79 (Fig. 3.5, Fig. 3.6 and Fig. 3.7); p. 356, line 29 to p. 357, line 21; p. 357 (Fig. 9.3), Apr. 1969.
Search Report issued in corresponding International Patent Application No. PCT/JP2016/055119, dated May 24, 2016.
Office Action issued in corresponding Indian Patent Application No. 201747029991, dated Jul. 16, 2019.
T. Martel et al., "Electric Vehicle Driving and Fast Charging System based on Configurable Modular Multilevel Converter (CMMC)," 2013 15th European Conference on Power Electronics and Applications, IEEE, Sep. 2, 2013, pp. 1-10.
Extended European Search Report issued in corresponding European Patent Application No. 19186876.9, dated Nov. 4, 2019.
Chinese Office Action issued in corresponding Chinese Patent Application No. 201680012006.8, dated Jan. 31, 2019, with English Translation.
Non-Final Office Action issued in U.S. Appl. No. 15/553,062, dated Aug. 24, 2018.
Notice of Allowance issued in U.S. Appl. No. 15/553,062, dated Sep. 10, 2019.
Extended European Search Report issued in corresponding European Patent Application No. 16755428.6-1201, dated Sep. 17, 2018.

* cited by examiner

FIG.4
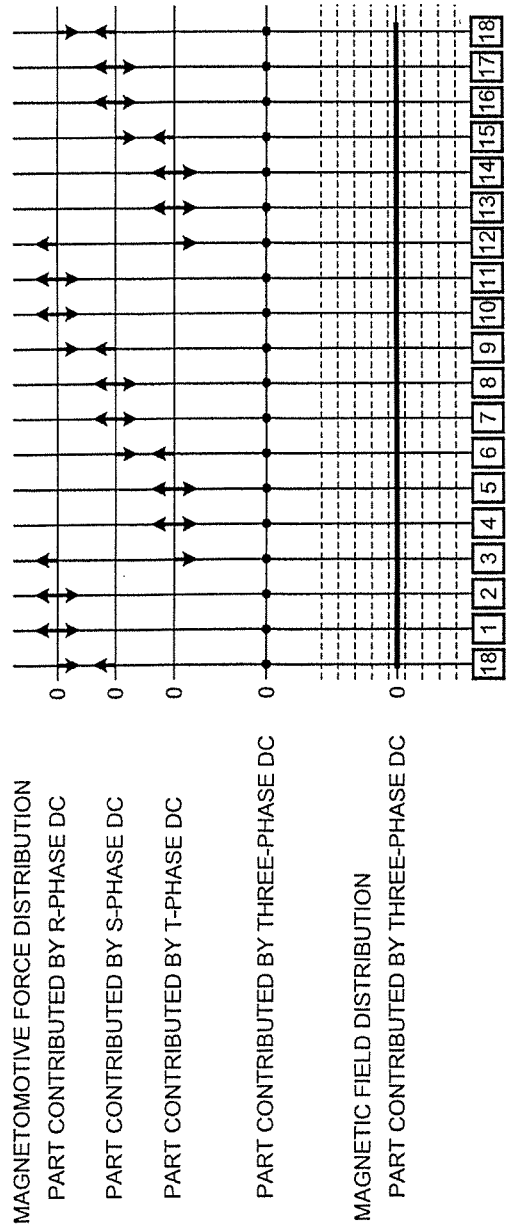
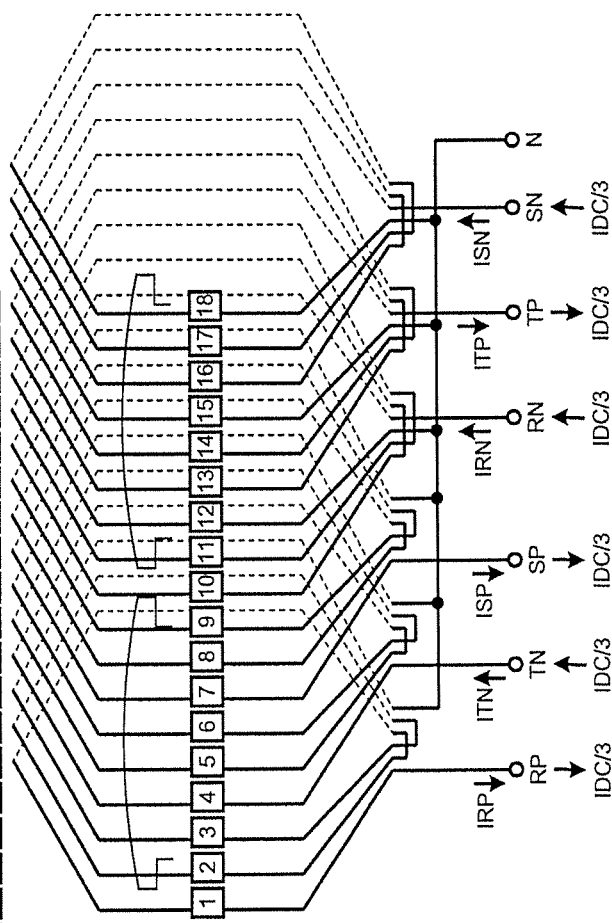

FIG.7
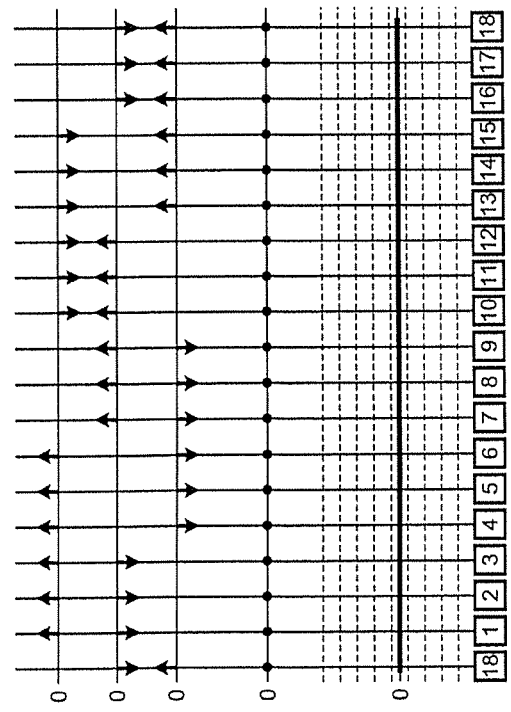
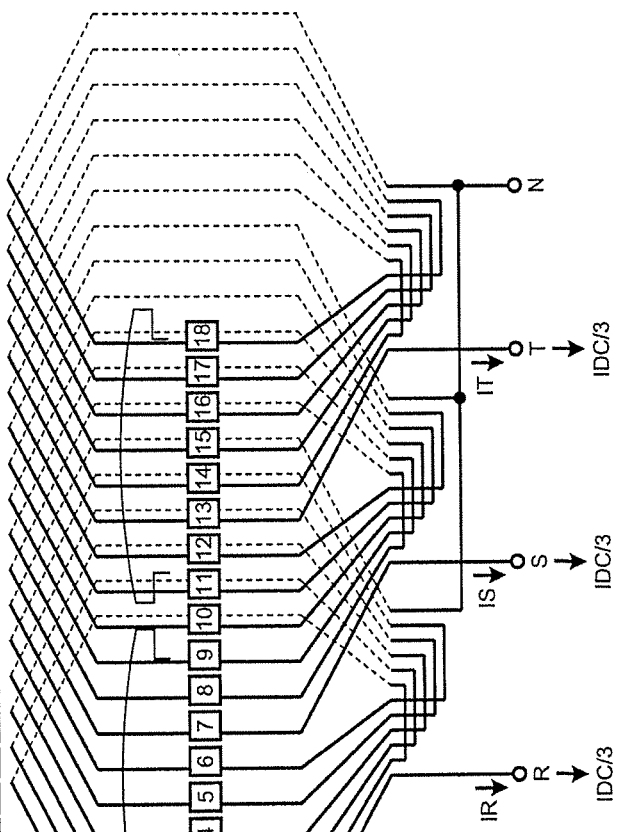

VARIABLE SPEED GENERATOR-MOTOR APPARATUS AND VARIABLE SPEED GENERATOR-MOTOR SYSTEM

CROSS-REFERENCE

This application is a Divisional of U.S. application Ser. No. 15/553,062, filed Aug. 23, 2017, which is the U.S. National Phase under 35 US.C. § 371 of International Application No. PCT/JP2016/055119, filed on Feb. 22, 2016, which claims the benefit of Japanese Application No. 2015-035772, filed on Feb. 25, 2015, the entire contents of each are hereby incorporated by reference.

FIELD

The present invention relates to a variable speed generator-motor apparatus in which a modular multilevel PWM power converter (hereinafter referred to as an "MMC converter" in the present invention) is connected to an AC rotating electric machine, and to a variable speed generator-motor system that includes the variable speed generator-motor apparatus.

BACKGROUND

An MMC converter circuit is composed of unit converters that each generate a desired voltage by controlling the modulation factor of a PWM converter that uses an energy storage element with the voltage source characteristics, such as a capacitor or a storage battery, as a voltage source. The voltage of the energy storage element for the unit converter fluctuates according to charging and discharging performed with a period determined by the AC frequency. The unit converters are connected in series to form a two-terminal arm. The first terminals of the two-terminal arms are connected to the terminals for respective phases of an AC power supply and the star-connected second terminals are connected to the terminal of a DC power supply.

With this configuration, the arm connected to each phase generates a voltage with a desired AC frequency to control the alternating current while at the same time superimposing direct current to realize power conversion with the DC power supply.

Control associated with the MMC converter includes current control of adjusting an arm current in accordance with an AC command and a DC command from an external source (such control will hereinafter be referred to as "converter current control" in the present invention); a function of keeping the average voltage of the energy storage element in balance among the unit converters by mutually adjusting the modulation factors of the PWM converters provided in the unit converters within the arms (such a function will hereinafter be referred to as "interstage control" in the present invention); and a function of keeping the total amount of energy stored in the energy storage element in the arm in balance among the arms (such a function will hereinafter be referred to as "interphase balance control" in the present invention). Implementation of the interphase balance control requires a circuit element to reduce current circulating among the arms.

Patent Literature 1 discloses a technology in which a circulating current control reactor is provided between the first terminal of the arm for each phase and the terminal of the AC power supply (this will be referred to as a "DSMMC converter" in the present invention).

Patent Literature 2 discloses a method in which a transformer that includes double star-connected secondary and tertiary windings is provided to cancel out the DC magnetomotive force generated in the transformer core due to the circulating current while using leakage reactance of the secondary and tertiary windings as a current controlling circuit element (this will be hereinafter referred to as a "DSMMC converter" in the present invention).

Patent Literature 3 discloses a method in which a transformer that includes zigzag-connected secondary and tertiary windings is provided to cancel out the DC magnetomotive force generated in the transformer core due to the circulating current while using leakage reactance of the secondary and tertiary windings as a current controlling circuit element (this will hereinafter be referred to as a "ZCMMC converter" in the present invention).

Non Patent Literature 1 discloses a method of connecting the DC terminals of two DSMMC converters back to back as a method of connecting the DC terminals of two MMC converters back to back to be a variable frequency power supply as well as connecting one AC terminal to an AC system and connecting the other AC terminal to an AC rotating electric machine to form a variable speed generator-motor apparatus.

With such a method, direct current is not superimposed in the AC rotating electric machine connected to the MMC converter. This method is thus suitable for varying the speed of the AC rotating electric machine that is connected directly to the AC system and operated at a fixed frequency.

Patent Literature 4 discloses a method of connecting the ZCMMC converter to the side of the AC rotating electric machine. It is argued that, with such a method, an AC electrical system can be implemented without including the circulating current control reactor.

Patent Literature 5 discloses a method of measuring the vectors of variable frequency voltage/current signals of the AC rotating electric machine.

CITATION LIST

Patent Literature

Patent Literature 1: Japanese Patent No. 5189105
Patent Literature 2: International Publication WO 2009/135523
Patent Literature 3: Japanese Patent No. 5268739
Patent Literature 4: Japanese Laid-open Patent Publication No. 2013-162735
Patent Literature 5: Japanese Patent No. 5537095

Non Patent Literature

Non Patent Literature 1: Makoto Hagiwara, Kazutoshi Nishimura, and Hirofumi Akagi, "A Medium-Voltage Motor Drive with a Modular Multilevel PWM Inverter: Part I. Experimental Verification by a 400-V, 15-kW Downscaled Model", The Transactions of the Institute of Electrical Engineers of Japan. D, 130 (4), pp. 544-551, April, 2010
Non Patent Literature 2: Philip L. Alger, "Induction Machines", Second Edition, April, 1969

SUMMARY

Technical Problem

Static power converters using power semiconductor switching devices (hereinafter referred to as "switching devices" in the present invention) can be roughly classified as a line commutated current source converter (hereinafter referred to as an "LCC converter" in the present invention) that uses a switching device without a self-extinguishing function, such as a thyristor, and a self-commutated voltage source converter (hereinafter referred to as a "VSC converter" in the present invention) that uses a switching device with a self-extinguishing function, such as an IGBT.

With the VSC converter in particular, the temporal rate of change of coil voltage of a rotating electric machine increases as the voltage of the switching device increases, and, as the switching characteristics are improved, the PWM frequency is increased in order to suppress the harmonic current, which causes an increase in coil leakage current.

This is a bottleneck particularly in a case where the speed is varied of the AC rotating electric machine that is installed under the assumption that there is a commercial AC frequency power supply.

An MMC converter is classified as a VSC converter equipped with PWM control. Unlike a conventional PWM converter, the MMC converter includes N stages of serially connected unit converters to be able to suppress the width of voltage pulsation due to PWM control to 1/N without using complex connection in wiring of a reactor and a transformer and suppress the harmonic component of the voltage applied to the AC rotating electric machine. The adoption of the MMC converter allows for use of the rotating electric machine without reinforcing coil insulation thereof and it is particularly suitable for varying the speed of the AC rotating electric machine that is installed under the assumption of a constant frequency of an AC power supply system.

Moreover, an MMC converter allows the number of serially connected unit converters to have redundancy so as to be able to increase the availability by short-circuiting the output terminal of a failed unit converter. The MMC converter is thus suitable for varying the speed of a high-capacity AC rotating electric machine that requires a large number of unit converters.

Non Patent Literature 1 discloses a technology suitable for realizing such features. It is argued in Patent Literature 4 that the variable speed generator-motor apparatus can be implemented by connecting the ZCMMC converter.

However, the two aforementioned literatures do not disclose any problems and solutions to the problems that inevitably arise when the speed of the AC rotating electric machine is varied by using the MMC converter.

A first problem comes from the characteristic that the output current capacity of the MMC converter is proportional to the frequency. The current capacity decreases in a low frequency output region, thereby causing a problem in that the starting torque of the AC rotating electric machine cannot be ensured because, in principle, the output torque of the machine is proportional to the current. There is a problem in that such a converter cannot be applied to the starting of synchronous machines that make up the majority of high-capacity rotating electric machines that are suitable particularly for making use of the features of the MMC converter. This problem is common to all of the DSMMC converter, DIMMC converter, and ZCMMC converter connected to the AC rotating electric machine; however, no problems and solutions thereof are disclosed in Non Patent Literature 1 and Patent Literature 4.

A second problem comes from intentionally superimposing direct current on a winding of the rotating electric machine.

Non Patent Literature 2 points out on page 356 that "even the imbalance in magnetic attraction due to a zigzag leakage flux caused by a combination of a stator and the number of core slots of a rotor of an induction machine becomes a problem".

Further, when the direct current is superimposed intentionally as with the DIMMC converter and the ZCMMC converter, cancellation of the DC magnetomotive force generated by coil current inside the core slot is the minimum requirement. This problem is common to the cases where a synchronous machine and an induction machine are adopted as the AC rotating electric machine.

On the other hand, it is argued in Patent Literature 4 that "when trisected direct current is fed to each of three-phase windings, the magnetic field generated by a zero-phase current becomes zero".

Non Patent Literature 2 introduces three kinds of armature windings from page 76 to page 79. The same literature introduces a winding formed from a single layer coil in FIG. 3.5, a winding with a 60-degree phase zone formed from a double layer coil in FIG. 3.6, and a winding with a 120-degree phase zone formed from a double layer coil in FIG. 3.7. Among these, the argument in Patent Literature 4 holds true only in the 120-degree phase zone configuration formed from the double layer coil illustrated in FIG. 3.7, where the argument states that "when the trisected direct current is fed to each of the three-phase windings, magnetomotive force within a slot is cancelled out to cause the magnetic field generated by the zero-phase current to be zero". The three kinds of windings will now be described.

As for the single layer coil, the coil current inside the slot is monophase; therefore, the magnetomotive force cannot be cancelled out in principle.

FIG. 21 illustrates an example of a 60-degree phase zone formed from a double layer coil with the armature winding of a two pole motor accommodated in 18 slots.

FIG. 21 illustrates a magnetomotive force distribution and a magnetic field distribution when the trisected direct current is fed to each phase of the star-connected three-phase windings in FIG. 3.6 obtained by developing FIG. 3.3 in Non Patent Literature 2 onto the circumference of a circle. Note that in FIG. 21, a solid line indicates an upper coil of the double layer coil and a dashed line indicates a lower coil thereof.

Here, the diagram illustrates the distribution of the magnetomotive force generated by the winding of each phase when a trisected direct current $IDC/3$ is fed from the terminal N to each of the three-phase (RST) terminals, and the magnetomotive force distribution and the magnetic field distribution due to the three phases added together. As illustrated in FIG. 21, the direct current generates a near-sine wave magnetic field flux distribution and thus is not practical.

Next, FIG. 7 illustrates an example of a 120-degree phase zone formed from the double layer coil with the armature winding of the two pole motor accommodated in 18 slots.

FIG. 7 illustrates a magnetomotive force distribution and a magnetic field distribution when the trisected direct current is fed to each phase of the star-connected three-phase windings in FIG. 3.7 of Non Patent Literature 2 upon changing the winding from a short pitch winding (with a coil pitch of 8/9) to a full pitch winding. Note that in FIG. 7, a solid line indicates an upper coil of the double layer coil and a dashed line indicates a lower coil thereof.

Here, the diagram illustrates the distribution of the magnetomotive force generated by the winding of each phase when the trisected direct current $IDC/3$ is fed from the terminal N to each of the three-phase (RST) terminals, and the magnetomotive force distribution and the magnetic field distribution due to the three phases added together. As illustrated in FIG. 7, the magnetomotive force generated by superimposition of the direct current is cancelled out within each slot and makes no contribution to the magnetic field distribution.

Therefore, when the ZCMMC converter and the AC rotating electric machine are connected to form the variable speed generator-motor apparatus, it is required to "superimpose the trisected direct current onto each phase of the armature winding in the 120-degree phase zone formed from the double layer coil" of the AC rotating electric machine.

However, when the speed of an existing AC rotating electric machine is to be varied, priority is in many cases given to the winding factor and harmonic component and there are not necessarily a number of cases where the 120-degree phase zone is applied. Accordingly, the method in Patent Literature 4 can be applied to vary the speed of an existing machine in only a limited number of cases.

On the other hand, as for the armature winding with the 60-degree phase zone formed from the double layer coil, the method illustrated in FIG. 4 can cancel out the magnetomotive force generated by superimposition of the trisected direct current within each slot so that the magnetomotive force makes no contribution to the magnetic field distribution.

In FIG. 4, the three-phase terminal in FIG. 21 is divided for each of the magnetic poles generated by the three-phase coils, and then the direct current to be superimposed on each of the first set of three-phase terminals (RP, SP, TP) and the second set of three-phase terminals (RN, SN, TN) is divided into three equal parts to superimpose direct current reverse in polarity to each other.

FIG. 4 illustrates the distribution of the magnetomotive force generated at this time by the winding of each phase, and the magnetomotive force distribution and the magnetic field distribution due to the three phases added together. As illustrated in FIG. 4, the magnetomotive force generated by superimposition of the direct current is cancelled out within each slot so as to be able to make no contribution to the magnetic field distribution. However, there is a problem with the ZCMMC converter in that the direct current with an opposite polarity cannot be superimposed.

An object of the present invention is to solve the aforementioned problems and provide a variable speed generator-motor apparatus that uses a large AC generator-motor and provide a variable speed generator-motor system.

Solution to Problem

In order to achieve the aforementioned object, an aspect of the present invention provides a stable variable speed generator-motor apparatus in which an armature winding of an AC electric machine forms a 60-degree phase zone with a double layer coil that is divided into a positive pole side and a negative pole side to form a star connection by binding neutral terminals, where a terminal on the positive pole side is connected to a first terminal of an arm of a DIMMC converter, a terminal on the negative pole side is connected to a second terminal of the arm of the DIMMC converter, and direct current flowing through the windings on the positive side and the negative side has the same value in an opposite polarity and is trisected for the respective phases to be able to cancel out a magnetomotive force caused by the direct current within a coil slot.

Alternatively, in order to achieve the aforementioned object, a stable variable speed generator-motor apparatus is provided, in which an armature winding of an AC rotating electric machine forms a 120-degree phase zone with a double layer coil, where direct current through each arm of a ZCMMC converter is trisected to be able to cancel out the magnetomotive force caused by the superimposed direct current within the coil slot.

Still alternatively, in order to achieve the aforementioned object, an aspect of the present invention provides a variable speed generator-motor apparatus that is stable while at the same time capable of bypassing the DIMMC converter where, with n and m each being a natural number, an armature winding of a (4 χ n)-pole AC rotating electric machine forms a 60-degree phase zone with a double layer coil, the winding is bisected into a positive pole and a negative pole to form a star connection with two sets of three-phase terminals by serially connecting a (2×n)-pole winding to each phase and establishing an m-fold parallel connection, the three-phase terminals on the positive pole side are connected to the first terminal of the arm of the DIMMC converter, the second terminal is connected to a positive terminal of a DC power supply, the three-phase terminals on the negative pole side are connected to the second terminal of the arm of the DIMMC converter, the first terminal is connected to a negative terminal of the DC power supply, the direct currents flowing through the positive arm and negative arm of the MMC converter are identical but are opposite in polarity, and the direct current is trisected for the respective phases to be able to cancel out the magnetomotive force caused by the superimposed direct current within the coil slot. In particular, when the AC rotating electric machine having the (4×n)-pole, (2×m)-fold parallel star connection is to be varied in speed by changing the connections of the coil ends of the armature winding, the terminal voltage can be maintained before and after the change; therefore, it is possible to provide a variable speed generator-motor apparatus that can realize a bypass operation not going through a converter and for which an existing AC apparatus can be used.

Still alternatively, in order to achieve the aforementioned object, an aspect of the present invention is adapted to connect a synchronous machine having a damper winding with a DSMMC converter, a DIMMC converter, or a ZCMMC converter, short-circuit a field winding with a resistor when the machine is at rest, and fix each of the current and frequency of the arm to approximately 10% of a rated value to start the MMC converter and start the AC rotating electric machine as an induction machine.

Still alternatively, in order to achieve the aforementioned object, an aspect of the present invention is adapted to temporarily stop the MMC converter once the rotational speed accelerates to a value corresponding to a converter frequency, change the connection of the field winding from a resistor to an excitation converter, and then restart the MMC converter with a current command proportional to the rotational speed to perform acceleration. As a result, a variable speed generator-motor apparatus is provided that can perform self-starting.

Advantageous Effects of Invention

According to the present invention, the AC rotating electric machine can be varied in speed simply by making a change to the coil ends of the armature winding of the AC rotating electric machine that is installed under the assumption that it is operated with a fixed frequency by an AC system. In particular, it is possible to promptly vary the speed of AC rotating electric machines in hydraulic power plants and pumped storage power plants that are effective in suppressing fluctuations of power systems accompanying the growth in use of renewable energy generated by solar power generation systems, wind power generation systems, and the like.

BRIEF DESCRIPTION OF DRAWINGS

FIG. 4 is a diagram illustrating an armature winding of an AC rotating electric machine according to the first embodiment of the present invention.

FIG. 7 is a diagram illustrating an armature winding of an AC rotating electric machine according to the second embodiment of the present invention.

DESCRIPTION OF EMBODIMENTS

Embodiments of a variable speed generator-motor apparatus and a variable speed generator-motor system according to the present invention will now be described in detail with reference to the drawings. Note that the present invention is not to be limited by the embodiments.

First Embodiment

Figure 1:
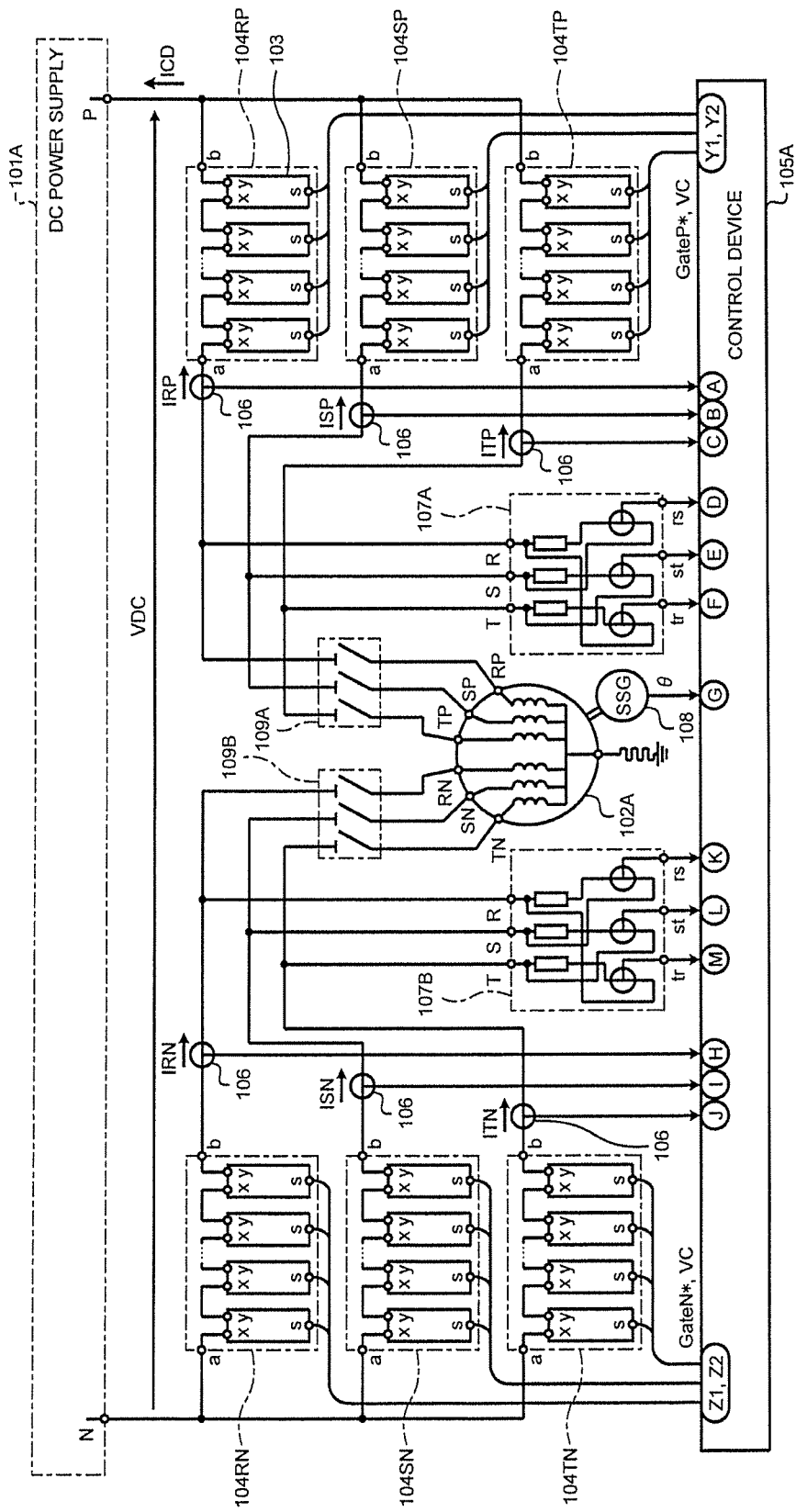
FIG. 1 is a circuit diagram illustrating a first embodiment of the present invention.

FIG. 1 is a circuit diagram illustrating a first embodiment of the present invention.

There are a DC power supply 101A and an AC rotating electric machine 102A. The AC rotating electric machine 102A includes two sets of star connections and is provided with three-phase terminals (RP, SP, TP) and three-phase terminals (RN, SN, TN), where the neutral points of the two sets of star connections are bound together so as to be drawn out to the terminal N and grounded via high resistance. There are six arms (104RP, 104SP, 104TP, 104RN, 104SN, 104TN), each of which includes two terminals (a, b) and is made up of N stages of serially connected output terminals (x, y) of unit converters 103 of an MMC converter, where the terminals b of the three arms (104RP, 104SP, 104TP) are star-connected to the first terminal (P) of the DC power supply 101A and the terminals a of the arms are connected to the three-phase terminals (RP, SP, TP) of the AC rotating electric machine 102A. The terminals a of the remaining three arms (104RN, 104SN, 104TN) are star-connected to the second terminal (N) of the DC power supply 101A and the terminals b of the arms are connected to the three-phase terminals (RN, SN, TN) of the AC rotating electric machine 102A.

A control device 105A receives a signal from each of DC current transformers 106 measuring the output current of the six arms, a DC voltage transformer 107A measuring the line voltage across the three-phase terminals (RP, SP, TP), a DC voltage transformer 107B measuring the line voltage across the three-phase terminals (RN, SN, TN), and a phase detector 108 measuring the rotational phase θ expressed in electrical degrees, and then performs an control operation to output gate signals (GateP*, GateN*) to the unit converters 103. Disconnectors 109A and 109B are closed during normal operation and are open during maintenance. The phase detector 108 may also estimate the rotational phase θ by performing a vector operation on the basis of the line voltages measured by the DC voltage transformers 107A and 107B and current signals from the DC current transformers 106.

Patent Literature 5 discloses a method of performing a vector operation on an AC signal that changes with rotational speed/frequency as well as a method of calculating the phase of the internal induced voltage corresponding to the rotational phase θ on the basis of a voltage signal and a current signal.

Figure 2:
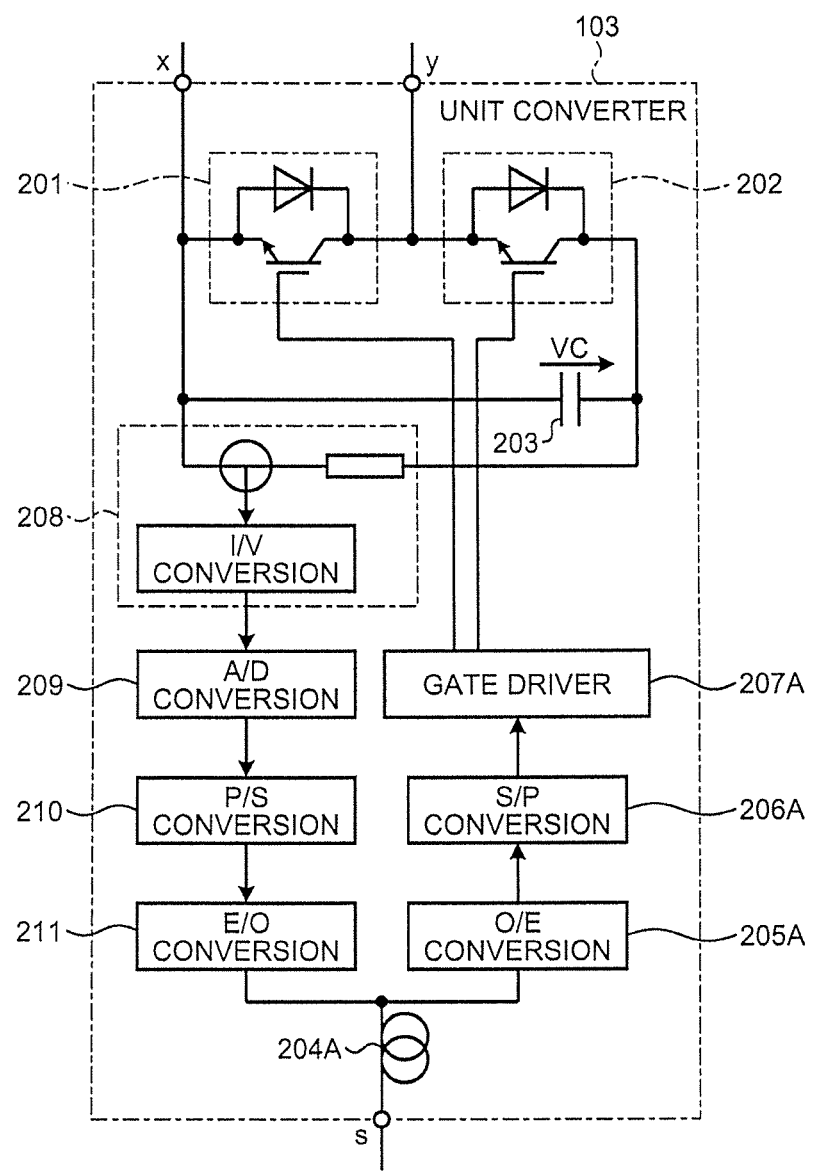
FIG. 2 is a circuit diagram of a unit converter according to an embodiment of the present invention.

FIG. 2 is a circuit diagram of the unit converter 103 according to the first embodiment. The unit converter 103 is configured such that a switching device 201 and a switching device 202 forming a bidirectional chopper circuit are connected to a capacitor 203, which functions as an energy storage element having voltage source characteristics. The unit converter 103 performs PWM control with a gate signal that is input, from an optical fiber cable 204A connected to the control device 105A, to a gate driver 207A for the switching devices 201 and 202 via a photoelectric conversion element 205A and a serial-parallel conversion circuit 206A and then adjusts the average voltage across the two terminals (x, y) between zero and a capacitor voltage VC. On the other hand, the capacitor voltage VC feeds an analog signal output by a DC voltage transformer 208 back to the control device 105A through the optical fiber cable 204A via an analog-digital converter 209, a parallel-serial converter 210, and an electro-optical conversion element 211. With this configuration, the current flows through either one of the switching devices 201 and 202; therefore, the loss can be minimized.

Figure 3:
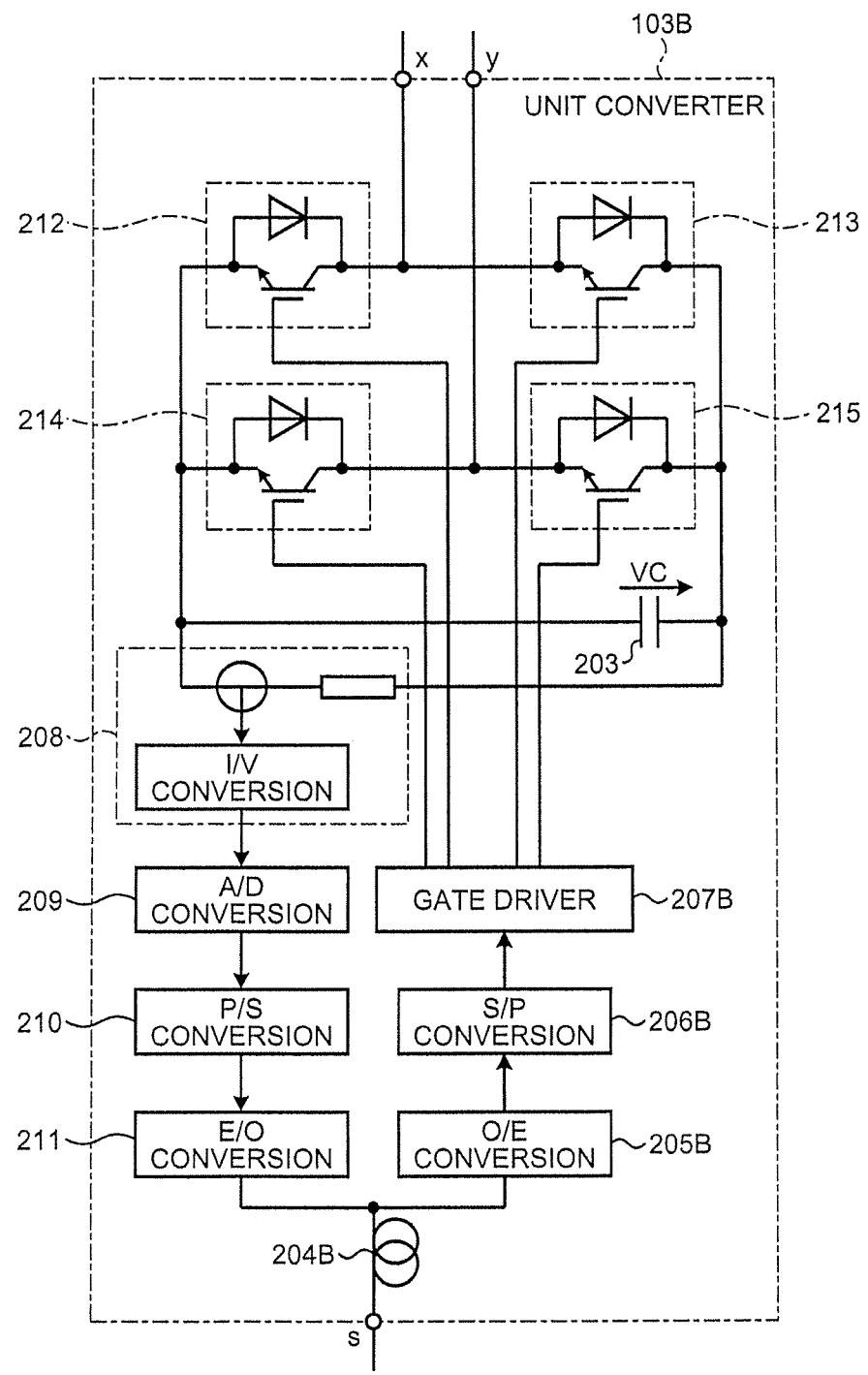
FIG. 3 is a circuit diagram of another unit converter according to an embodiment of the present invention.

FIG. 3 is a circuit diagram of another form of the unit converter 103 according to the first embodiment. A unit converter 103B includes switching devices 212, 213, 214, and 215 forming a full bridge circuit instead of the bidirectional chopper circuit illustrated in FIG. 2. With this configuration, with the capacitor voltage being VC, the average voltage across the terminals (x, y) can be adjusted between −VC and +VC.

FIG. 4 illustrates an example of an armature winding of the AC rotating electric machine and terminal connection according to the first embodiment. For the sake of simplicity, the figure illustrates an example of a two pole motor with 18 slots, which is close to a minimal configuration. Moreover, a salient-pole synchronous machine illustrated in this case to facilitate understanding of a relationship with a field system may instead be a cylindrical synchronous machine or induction machine.

Figure 21:
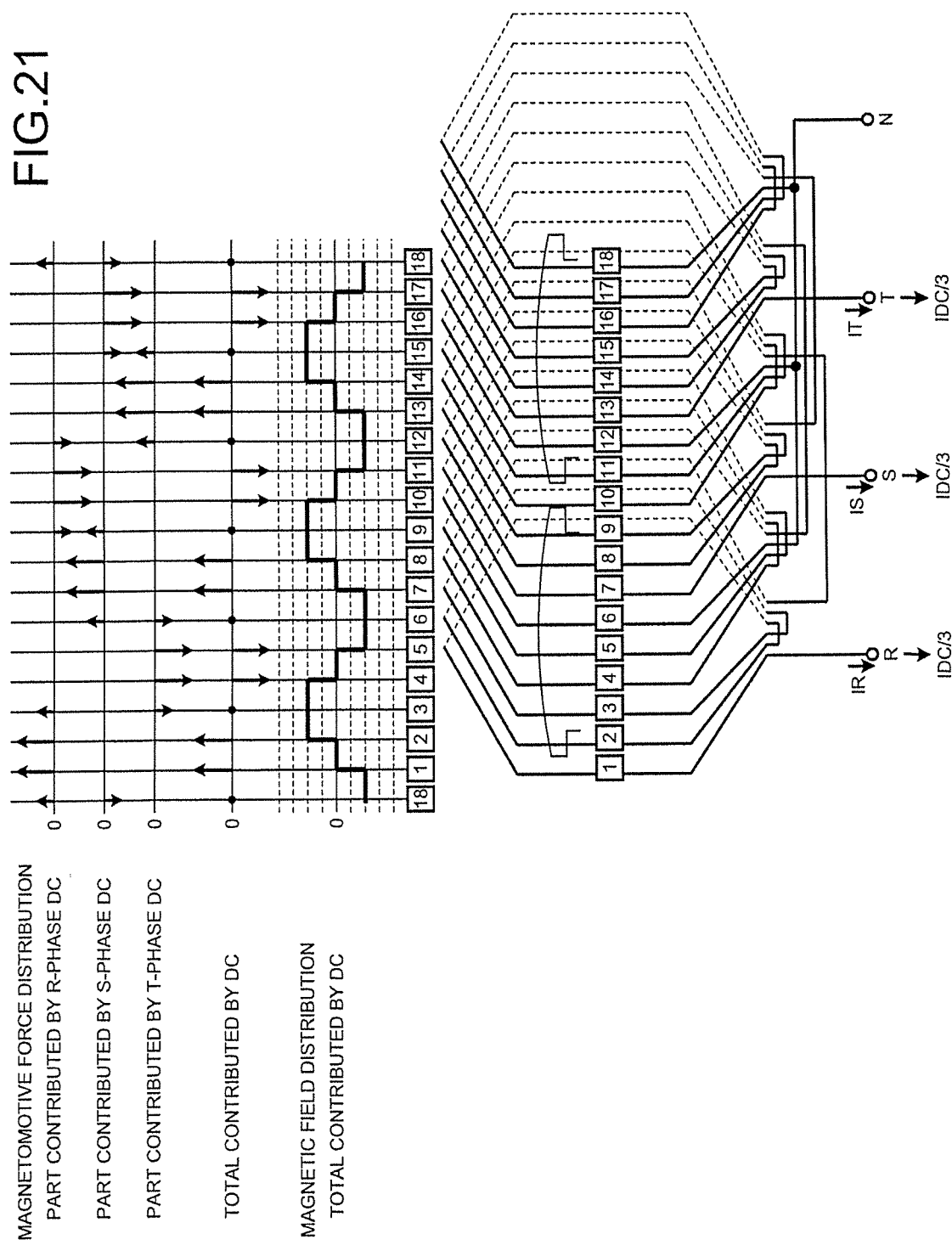
FIG. 21 is a diagram illustrating an armature winding of a conventional AC rotating electric machine (a single star-connected, 60-degree phase zone).

The following describes that the winding and terminal configuration in FIG. 4 can be implemented by changing connections of the coil ends and drawing out terminals on the basis of the winding and terminal configuration illustrated in FIG. 21.

FIGS. 21 and 4 both have a 60-degree phase zone configuration formed from a double layer coil and there is no change in the coil portions passing through the slots. In FIG. 21 illustrating the configuration before alteration, it has a normal single star connection of three-phase terminals (R, S, T), where coils generating a magnetic field of positive/reverse polarity in a gap are connected in series. In FIG. 4 illustrating the configuration after alteration, it has two sets of the three-phase terminals (RP, SP, TP) and (RN, SN, TN).

As described above, the alteration involves a change in connections of the coil ends of the armature winding and additional drawing out of the three terminals. The change in connections reduces the number of turns of the three-phase windings by half, whereby the line voltage equals one half of the value before the alteration. The current capacity of the armature coil does not change due to the alteration. The way the current capacity is used however changes due to the alteration.

The following describes a case where a synchronous machine is used as the AC rotating electric machine. The frequency of current before the alteration corresponds to the frequency of the AC system, where the effective value of the current equals the root sum square of the active power component and the reactive power component. The current after the alteration equals the root sum square of the effective value of the output frequency component of a power converter and the average value of the direct current. In principle, the phase voltages of the two sets of the three-phase terminals are in phase and have an equal effective value. Where the signs of the alternating currents (IRP_AC, ISP AC, ITP_AC) and (IRN_AC, ISN_AC, ITN_AC) flowing through two sets of windings are defined in FIG. 1, the currents are in opposite phases and have an equal effective value. The power factor of the alternating current is controlled such that it becomes unity. Here, it is assumed that VAC denotes the AC phase voltage of the power converter, IAC denotes the effective value of the current, and IDC denotes the direct current that is trisected for the windings of respective phases. With VDC denoting the output voltage of the DC power supply 101A, the relationship with an output capacity P becomes (P=6×VAC×IAC=VDC×IDC), in which the loss of the AC rotating electric machine and the power converter is ignored. The ratio of (IDC/3) to IAC varies depending on the capacities of the capacitors 203 of the unit converters 103 and the operation method at the time of power failure and also on which of the unit converters in FIGS. 2 and 3 is used.

In general, the ratio of (IDC/3) increases and an equivalent power factor decreases when the capacity of the capacitor 203 is reduced, the utilization factor of the capacitor voltage VC is reduced by reducing the upper and lower limits of the PWM modulation factor of the unit converter in order to increase availability (operation continuity) at the time of the power failure, and the bidirectional chopper circuit in FIG. 2 is used as the unit converter with importance placed on the efficiency of the power converter. When the ratio of (IDC/3) is designed to be high, the ratio roughly equals (IDC/3)/IAC=0.5. As a result, the equivalent power factor is reduced to approximately 0.9 with IAC being an active component of the current capacity contributing to the output and superimposed DC (IDC/3) being a reactive component. This value does not involve a scheme of the MMC converter.

As a result, when the rated power factor of the synchronous machine before the alteration equals 0.9 or less, the same active power output can be ensured after the alteration. The power factor cannot be adjusted when an induction machine is used as the AC rotating electric machine, in which case the active power output after the alteration is reduced to a value multiplied by the equivalent power factor of the MMC converter.

Figure 5:
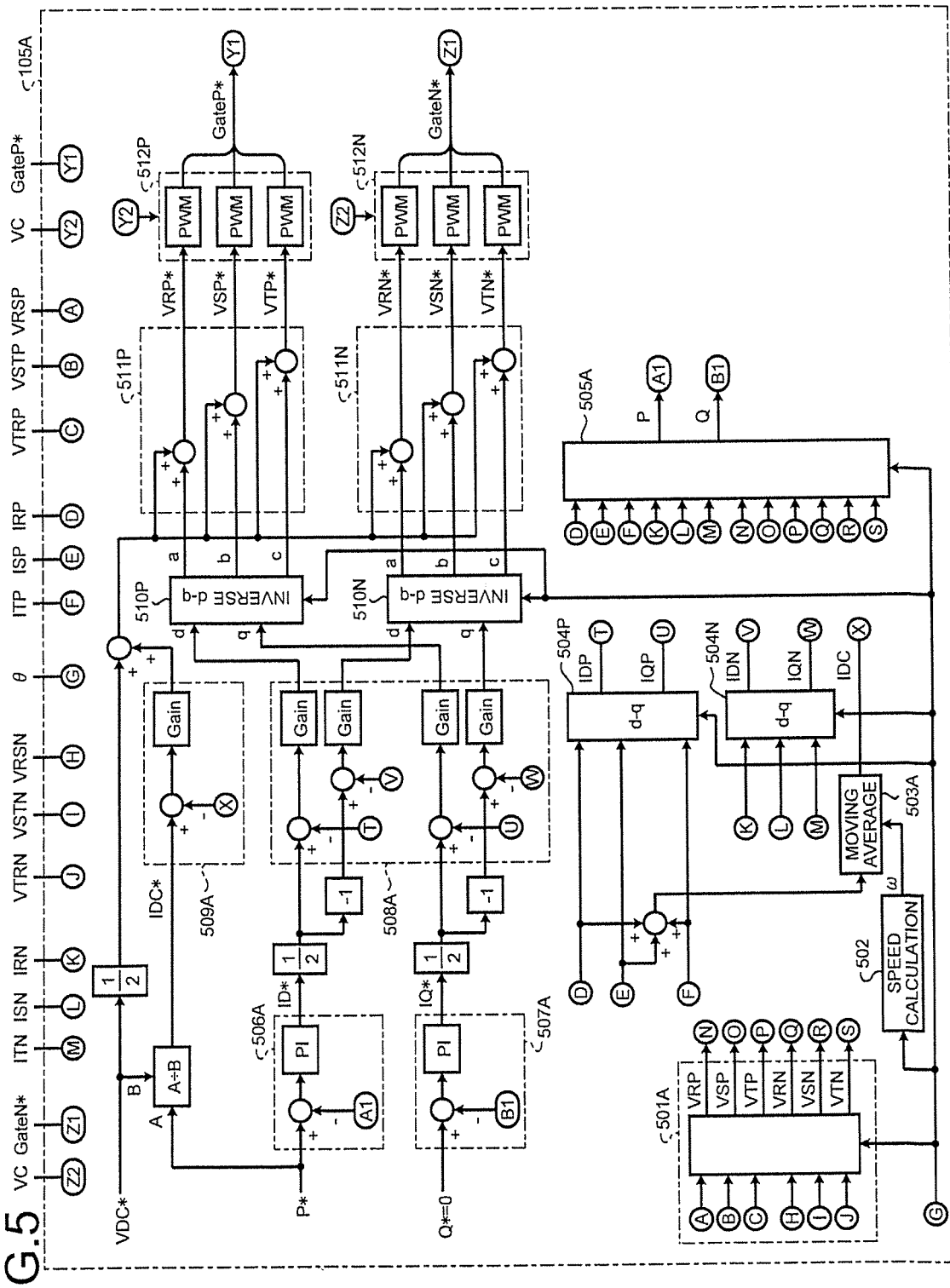
FIG. 5 is a control block diagram illustrating the first embodiment of the present invention.

FIG. 5 is a control block diagram of the control device 105A according to the first embodiment.

A phase voltage computing unit 501A calculates the phase voltage signal from two sets of three-phase line voltage detection signals. A speed computing unit 502 calculates a rotational speed frequency ω on the basis of the current value of the rotational phase θ and the number of samples Np from an in-phase signal in a previous period. Here, where Δt denotes a sampling period, there holds a relationship ω=2×π/(Np×Δt).

A moving average computing unit 503A calculates the direct current IDC by finding the moving average of the sum of the three-phase alternating current (IRP, ISP, ITP) Np times. A d-q converter 504P performs a calculation according to expression 1, and a d-q converter 504N performs a calculation according to expression 2. Note that the phase sequence is RST in this case.

[Expression 1]

$$\begin{bmatrix} IQP \\ IDP \end{bmatrix} = \sqrt{\frac{2}{3}} \begin{bmatrix} \cos\theta & \cos(\theta - 2\pi/3) & \cos(\theta + 2\pi/3) \\ \sin\theta & \sin(\theta - 2\pi/3) & \sin(\theta + 2\pi/3) \end{bmatrix} \begin{bmatrix} IRP \\ ISP \\ ITP \end{bmatrix} \quad \text{(expression 1)}$$

[Expression 2]

$$\begin{bmatrix} IQN \\ IQN \end{bmatrix} = \sqrt{\frac{2}{3}} \begin{bmatrix} \cos\theta & \cos(\theta - 2\pi/3) & \cos(\theta + 2\pi/3) \\ \sin\theta & \sin(\theta - 2\pi/3) & \sin(\theta + 2\pi/3) \end{bmatrix} \begin{bmatrix} IRN \\ ISN \\ ITN \end{bmatrix} \quad \text{(expression 2)}$$

A power computing unit 505A employs an instantaneous symmetrical coordinate method to calculate the active power P and reactive power Q from a rotational phase signal, a phase voltage signal, and an alternating current signal.

An active power adjustment unit 506A and a reactive power adjustment unit 507A output current commands ID* and IQ* such that command values P* and Q* correspond with the calculated values P and Q, respectively. An alternating current adjustment unit 508A performs a control operation such that one of the command values obtained by bisecting the command value ID* corresponds with a measured/calculated value IDP and a command value obtained by reversing the polarity of another one of the command values corresponds with a measured/calculated value IDN, and performs a control operation such that one of the command values obtained by bisecting the command value IQ* corresponds with a measured/calculated value IQP and a command value obtained by reversing the polarity of another one of the command values corresponds with a measured/calculated value IQN. A direct current adjustment unit 509A performs a control operation such that a DC command IDC* obtained by dividing an output command value P* by an output voltage VDC* of a DC power supply corresponds with the measured/calculated value IDC.

In the present embodiment, the degree of freedom of a current path is five, where there are four integration calculators in the alternating current adjustment unit 508A and there is one integration calculator in the direct current adjustment unit 509A. The total of five integration calculators corresponds to the five degrees of freedom of the current path. Thus, all the integration calculators can independently keep the input deviation to zero. Inverse d-q converters 510P and 510N perform a calculation according to expression 3.

[Expression 3]

$$\begin{bmatrix} a \\ b \\ c \end{bmatrix} = \sqrt{\frac{2}{3}} \begin{bmatrix} \cos\theta & \sin\theta \\ \cos(\theta - 2\pi/3) & \sin(\theta - 2\pi/3) \\ \cos(\theta + 2\pi/3) & \sin(\theta + 2\pi/3) \end{bmatrix} \begin{bmatrix} q \\ d \end{bmatrix} \quad \text{(expression 3)}$$

A DC voltage command correction computing unit 511P is provided for the arms 104RP, 104SP, and 104TP and a DC voltage command correction computing unit 511N is provided for the arms 104RN, 104SN, and 104TN, where the computing units output output voltage commands VRP*, VSP*, VTP*, VRN*, VSN*, and VTN* corresponding to the arms.

Accordingly, the three-phase terminals (RP, SP, TP) and the three-phase terminals (RN, SN, TN) of the AC rotating electric machine 102A have roughly equal phase voltages of (VR*, VS*, VT*); therefore, the output voltage commands for the arms 104RP and 104RN is roughly given by $VRP^* = +VR^* + (\frac{1}{2}) \times VDC$ and $VRN^* = -VR^* + (\frac{1}{2}) \times VDC$, respectively.

PWM computing units 512P and 512N thus output gate commands GateP* and GateN* on the basis of those output voltage commands and the capacitor voltage VC of the unit converter 103.

Second Embodiment

Figure 6:
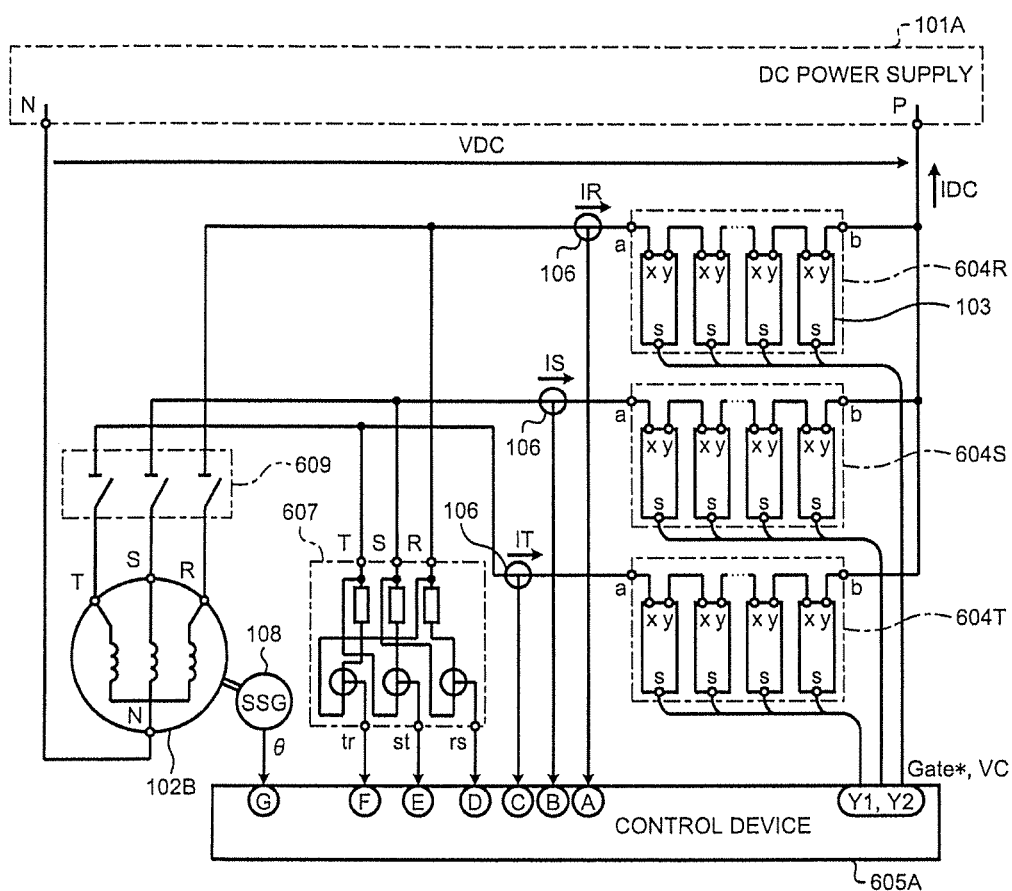
FIG. 6 is a circuit diagram illustrating a second embodiment of the present invention.

FIG. 6 is a circuit diagram illustrating a second embodiment of the present invention.

There are the DC power supply 101A and an AC rotating electric machine 102B. The AC rotating electric machine 102B includes one set of star connection and is provided with three-phase terminals (R, S, T), where the neutral point of the star connection is drawn out to the terminal N to be connected to the second terminal (N) of the DC power supply 101A. There are three arms (604R, 604S, 604T), each of which includes two terminals (a, b) and is made up of N stages of serially connected output terminals (x, y) of the unit converters 103 of an MMC converter, where the terminals a of the three arms are connected to the three-phase terminals (R, S, T) of the AC rotating electric machine 102B and the terminals b of the arms are star-connected to the first terminal (P) of the DC power supply 101A.

A control device 605A receives a signal from each of the DC current transformers 106 measuring the output current of the three arms, a DC voltage transformer 607 measuring the line voltage across the three-phase terminals (R, S, T), and the phase detector 108 measuring the rotational phase θ expressed in electrical degrees, and then performs an control operation to output a gate signal Gate* to the unit converters 103. A disconnector 609 is closed during normal operation and open during maintenance. The phase detector 108 may also estimate the rotational phase θ by performing a vector operation on the basis of the line voltage measured by the DC voltage transformer 607 and a current signal from the DC current transformers 106. FIG. 2 or 3 can be referenced as an embodiment of the unit converter 103.

FIG. 7 illustrates an example of an armature winding of the AC rotating electric machine and terminal connection according to the second embodiment. For the sake of simplicity, the figure illustrates an example of a two pole motor with 18 slots, which is close to a minimal configuration. Moreover, a salient-pole synchronous machine illustrated in this case to facilitate understanding of a relationship with a field system may instead be a cylindrical synchronous machine or induction machine.

The winding illustrated in FIG. 7 has a 120-degree phase zone configuration formed from a double layer coil. It is a normal single star connection with the three-phase terminals (R, S, T) drawn out.

The following describes a case where the AC rotating electric machine is a synchronous machine. The current before alteration corresponds to the frequency of the AC system, where the effective value of the current equals the root sum square of the active power component and the reactive power component. The current after the alteration corresponds to the output frequency of a power converter and direct current. The power factor of the alternating current (IR, IS, IT) is controlled such that it becomes unity. Here, it is assumed that VAC and IAC denote the AC phase voltage and the effective value of the current of the power converter, respectively, and that IDC denotes the superimposed direct current that is trisected for the windings of respective phases. With VDC denoting the output voltage of the DC power supply 101A, the relationship with the output capacity P becomes (P=3×VAC×IAC=VDC×IDC), in which the loss of the AC rotating electric machine and the power converter is ignored. The ratio of (IDC/3) to IAC is similar to the case in FIG. 1 and thus will not be described in order to avoid repetition.

When the rated power factor of the synchronous machine before the alteration equals 0.9 or less, the same active power output can be ensured after the alteration. The power factor cannot be adjusted when an induction machine is used as the AC rotating electric machine, in which case the active power output after the alteration is reduced to a value multiplied by the equivalent power factor of the MMC converter.

Figure 8:
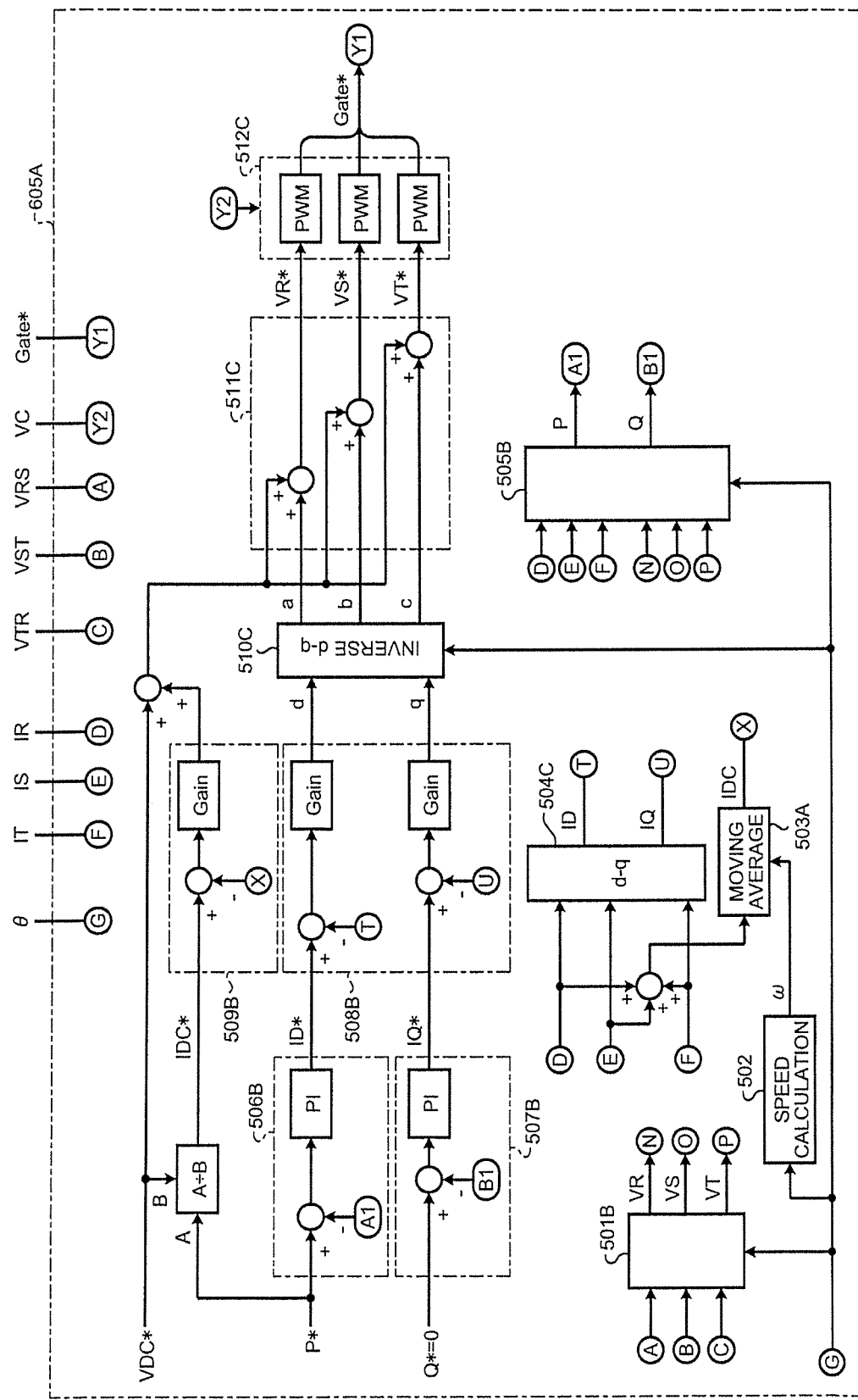
FIG. 8 is a control block diagram illustrating the second embodiment of the present invention.

FIG. 8 is a control block diagram of the control device 605A according to the second embodiment.

A phase voltage computing unit 501B calculates the phase voltage signal from the line voltage detection signal. The control device 605A also includes the speed computing unit 502 and the moving average computing unit 503A that calculates the direct current IDC by finding the moving average of the sum of the three-phase alternating current (IR, IS, IT) Np times. A d-q converter 504C performs a calculation according to expression 4. Note that the phase sequence is RST in this case.

[Expression 4]

$$\begin{bmatrix} IQ \\ ID \end{bmatrix} = \sqrt{\frac{2}{3}} \begin{bmatrix} \cos\theta & \cos(\theta - 2\pi/3) & \cos(\theta + 2\pi/3) \\ \sin\theta & \sin(\theta - 2\pi/3) & \sin(\theta + 2\pi/3) \end{bmatrix} \begin{bmatrix} IR \\ IS \\ IT \end{bmatrix} \quad \text{(expression 4)}$$

A power computing unit 505B employs the instantaneous symmetrical coordinate method to calculate the active power P and reactive power Q from a phase voltage signal and an alternating current signal.

An active power adjustment unit 506B and a reactive power adjustment unit 507B output current commands ID* and IQ* such that command values P* and Q* correspond with the calculated values P and Q, respectively. An alternating current adjustment unit 508B performs a control operation such that the command values ID* and IQ* correspond with measured/calculated values ID and IQ, respectively. A direct current adjustment unit 509B performs a control operation such that a DC command IDC* obtained by dividing an output command value P* by an output voltage VDC* of a DC power supply corresponds with the measured/calculated value IDC.

In the present embodiment, the degree of freedom of a current path is three, where there are two integration calculators in the alternating current adjustment unit 508B and there is one integration calculator in the direct current adjustment unit 509B. This means that there are three integration calculators altogether. Thus, all the integration calculators can independently keep the input deviation to zero. An inverse d-q converter 510C performs a calculation according to expression 3.

A DC voltage command correction computing unit 511C is provided for the arms 604R, 604S, and 604T, and the computing unit outputs output voltage commands VR*, VS*, and VT* corresponding to the arms.

Accordingly, when the three-phase terminals (R, S, T) of the AC rotating electric machine 102B have phase voltages of (VRG*, VSG* VTG*), the output voltage command for the arm 104R is given by

VR*=+VRG*+(½)×VDC.

A PWM computing unit 512C thus outputs a gate command Gate* on the basis of those output voltage commands and the capacitor voltage VC of the unit converter 103.

Third Embodiment

Figure 9:
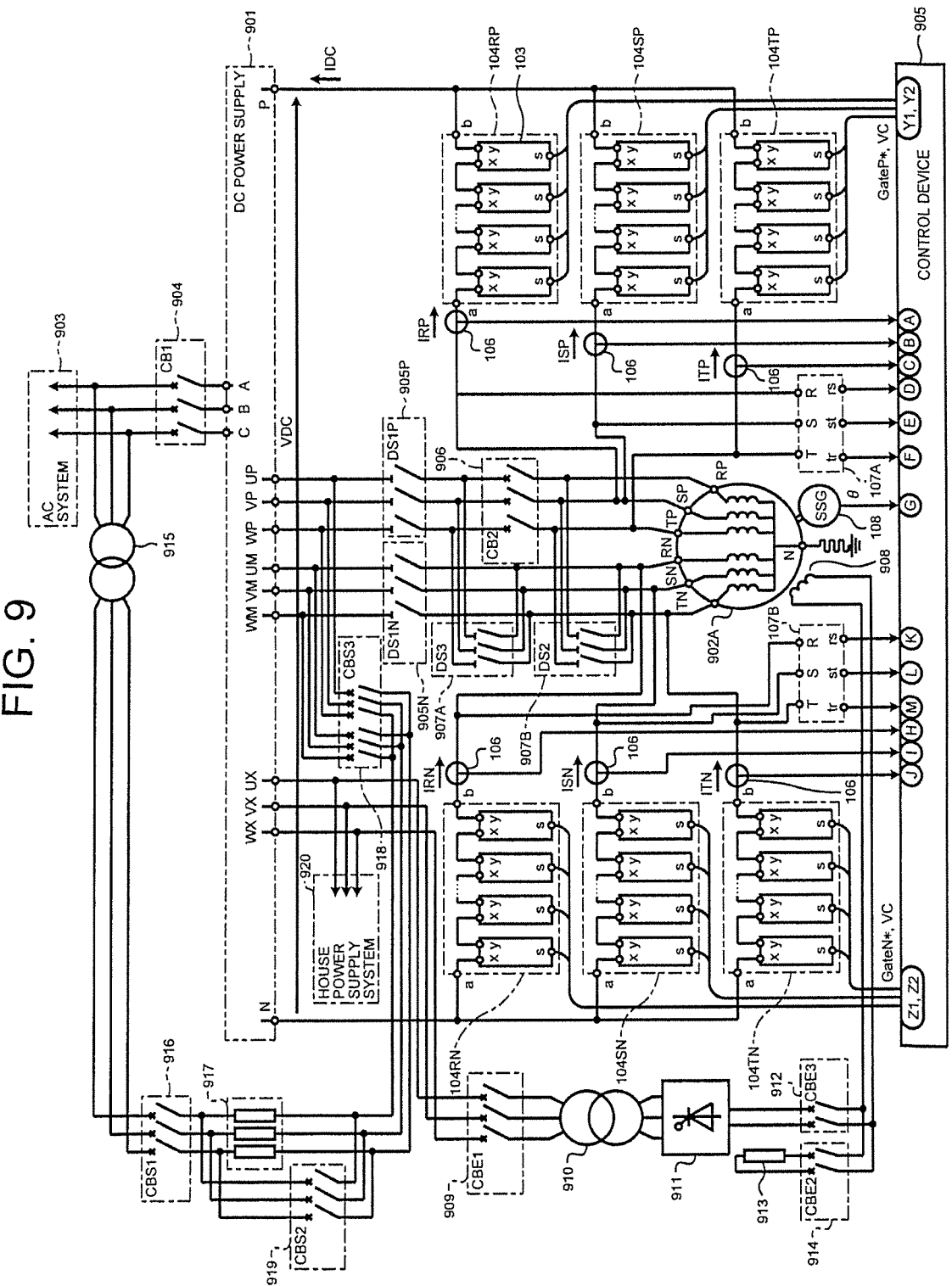
FIG. 9 is a circuit diagram illustrating a third embodiment of the present invention.

FIG. 9 is a circuit diagram illustrating a third embodiment of the present invention. Here, an AC rotating electric machine 902A is a synchronous machine that includes a damper winding.

The AC rotating electric machine 902A that includes two sets of star connections is provided with three-phase terminals (RP, SP, TP) and three-phase terminals (RN, SN, TN), where the neutral points of the two sets of star connections are bound together so as to be drawn out to the terminal N and grounded via high resistance.

A DC power supply 901 performs power conversion between AC-system side terminals (A, B, C) and DC side terminals (P, N). The AC-system side terminals (A, B, C) are connected to an AC system 903 via a breaker 904.

The DC power supply 901 further includes three sets of AC terminals (UP, VP, WP), (UM, VM, WM), and (UX, VX, WX). The AC terminals (UP, VP, WP) are connected to the three-phase terminals (RP, SP, TP) of the AC rotating electric machine 902A via a disconnector 905P and a breaker 906. The AC terminals (UM, VM, WM) are connected to the three-phase terminals (RN, SN, TN) of the AC rotating electric machine 902A via a disconnector 905N. Moreover, the three-phase terminals (RP, SP, TP) and the three-phase terminals (RN, SN, TN) are connected by disconnectors 907A and 907B. The AC terminals (UX, VX, WX) are branched into a house power supply system 920 and a field power converter 911 via a field circuit breaker 909 and a field transformer 910. A field winding 908 is switchably connected by a breaker 914 connected to a resistor 913 and a breaker 912 connected to the field power converter 911.

The AC system 903 is connected to the AC terminals (UP, VP, WP) and (UM, VM, WM) via an initial charging transformer 915, an initial charging breaker 916, a current limiting resistor 917, and an initial charge connection breaker 918. A bypass circuit breaker 919 is provided for the current limiting resistor 917.

Figure 10:
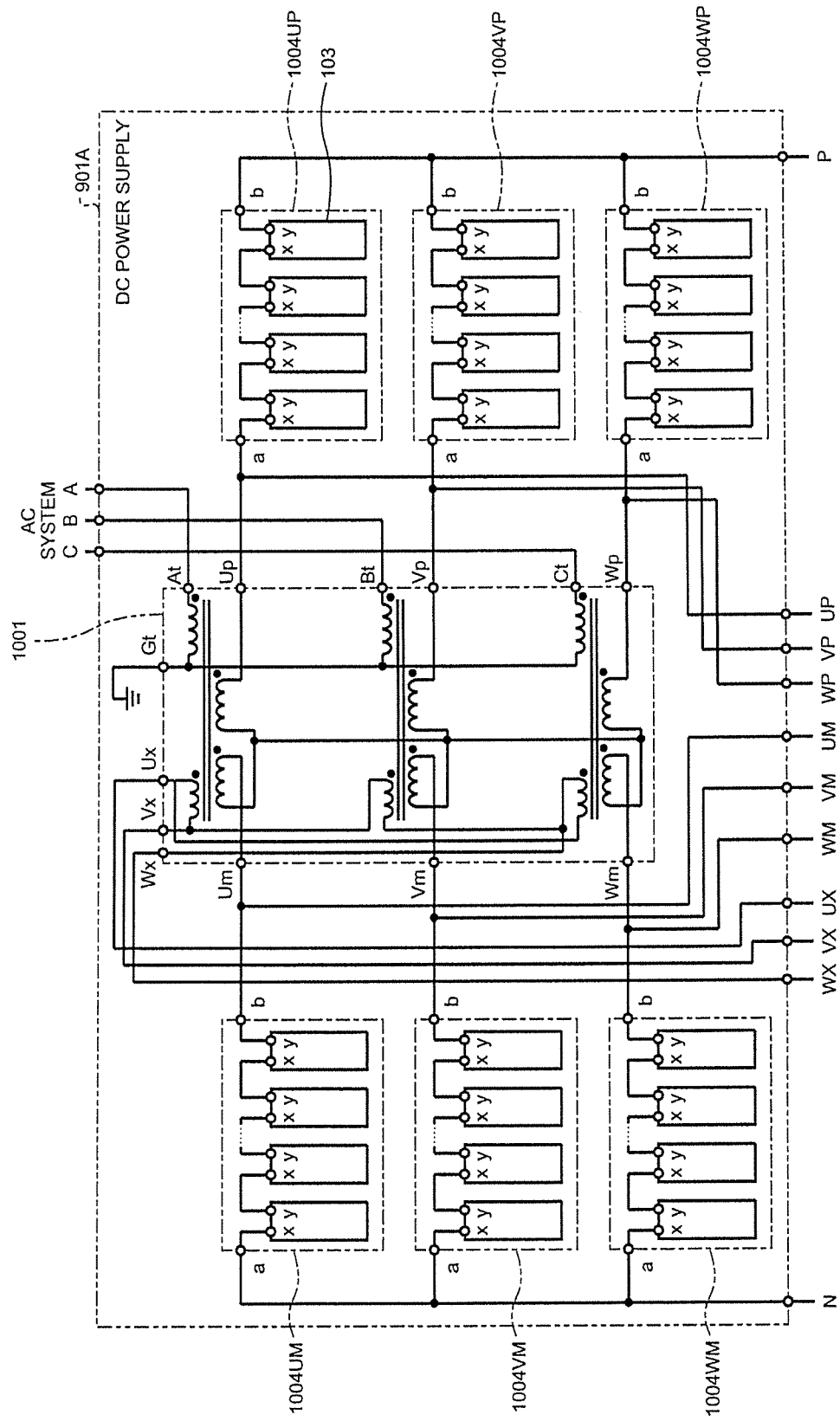
FIG. 10 is a circuit diagram of a DC power supply according to the third embodiment of the present invention.

FIG. 10 is a circuit diagram illustrating an embodiment of a DC power supply 901A that uses the DIMMC converter disclosed in Patent Literature 2.

The primary windings of a transformer 1001 are connected to AC-system side terminals (A, B, C), and the secondary and tertiary windings are connected to AC terminals (UP, VP, WP) and (UM, VM, WM) with double star connection. AC terminals (Up, Vp, Wp) of the transformer 1001 are connected to the terminals a of three two-terminal arms (1004UP, 1004VP, 1004WP) each made up of serially connected unit converters 103, and the terminals b of the arms are star-connected to the DC terminal (P). On the other hand, AC terminals (Um, Vm, Wm) are connected to the terminals b of three two-terminal arms (1004UM, 1004VM, 1004WM) each made up of serially connected unit converters 103, and the terminals a of the arms are star-connected to the DC terminal (N). The transformer 1001 is provided with delta-connected fourth windings that have a function of feeding power to a house power supply and a field circuit as well as a function of suppressing a third harmonic.

Figure 11:
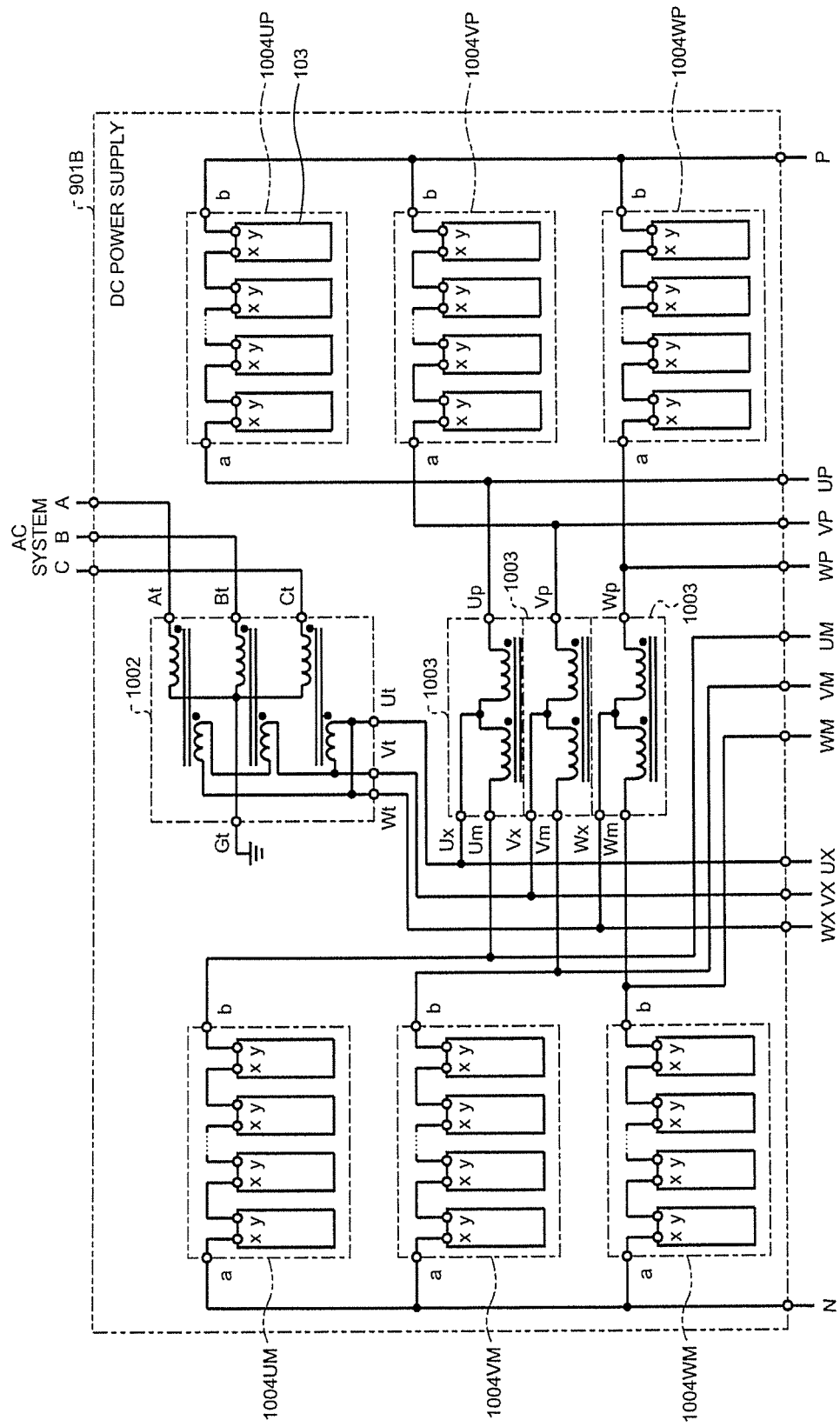
FIG. 11 is a circuit diagram of another DC power supply according to the third embodiment of the present invention.

FIG. 11 is a circuit diagram illustrating another embodiment of a DC power supply 901B that uses the DSMMC converter disclosed in Patent Literature 1.

Reference numerals identical to those assigned in FIG. 10 indicate identical components, which will not be described in order to avoid repetition.

The primary windings of a transformer 1002 are connected to AC-system side terminals (A, B, C), and terminals (Ut, Vt, Wt) of the delta-connected secondary windings are connected to the neutral points (Ux, Vx, Wx) of three sets of three-terminal reactors 1003. Terminals (Up, Vp, Wp) of the three-terminal reactors 1003 are connected to the terminals a of three two-terminal arms (1004UP, 1004VP, 1004WP) each made up of serially connected unit converters 103, and the terminals b of the arms are star-connected to the DC terminal (P). On the other hand, terminals (Um, Vm, Wm) of the three-terminal reactors 1003 are connected to the terminals b of three two-terminal arms (1004UM, 1004VM, 1004WM) each made up of serially connected unit converters 103, and the terminals a of the arms are star-connected to the DC terminal (N). The secondary windings of the transformer 1002 feed power to a house power supply and a field circuit via AC terminals (UX, VX, WX).

The following describes a procedure of charging the capacitor 203 of the unit converter 103 of the DC power supply 901 with the configuration illustrated in FIG. 9. The disconnectors 905P and 905N are kept open during the charging period.

When the initial charging breaker 916 and the initial charge connection breaker 918 are closed while keeping the bypass circuit breaker 919 open, the capacitors 203 of the unit converters 103 start being charged while the current limiting resistor 917 suppresses inrush current. The bypass circuit breaker 919 is then closed so as to accelerate charging. The initial charge connection breaker 918 is opened once charging is completed by a diode rectifying voltage across the AC terminal of the initial charging transformer 915, followed by closing of the breaker 904 to charge the transformer 1001 or 1002 of the DC power supply 901, and the unit converters 103 thereafter perform PWM control to charge the capacitors 203 such that the capacitor voltage is boosted to a desired voltage.

Next, the DC power supply 901 feeds power to the unit converters 103 of each of the six arms (104RP, 104SP, 104TP, 104RN, 104SN, 104TN) on the side of the AC rotating electric machine 902A and thus the capacitor 203 of each unit converter is charged by PWM control.

Once charging is completed in the aforementioned manner, only the unit converters 103 on the side of the DC power supply 901 can be actuated with the AC rotating electric machine 902A being stopped so as to operate as a reactive power adjustment unit. When a Francis pump turbine is directly connected to the AC rotating electric machine 902A, directions of power generation and water pumping have inverted phase sequences, which however can be switched simply by controlling of a converter and thus a phase inversion disconnector is not required.

According to the present embodiment, all the unit converters are already charged and thus can be started promptly for operations in the rotational directions of both power generation and electric operation.

Figure 12:
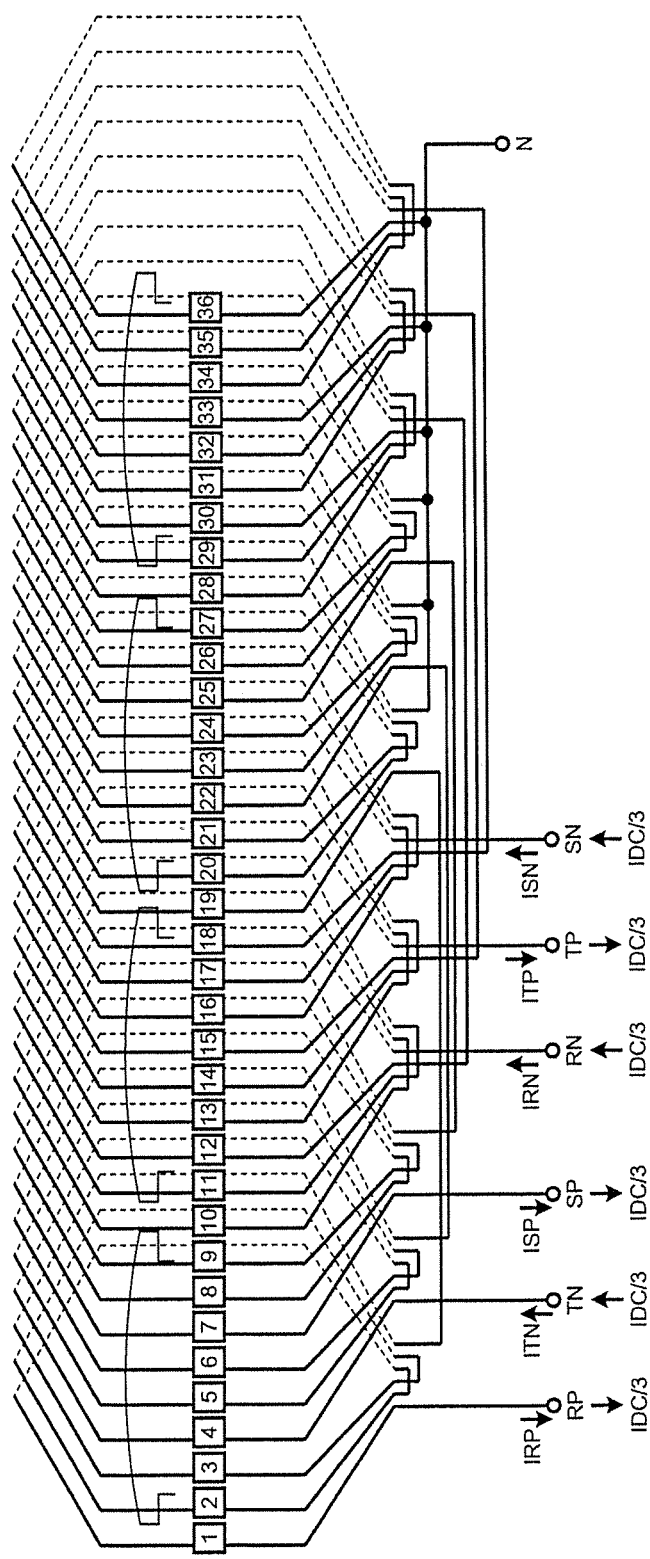
FIG. 12 is a diagram illustrating an armature winding of an AC rotating electric machine according to the third embodiment of the present invention.

FIG. 12 illustrates an example of an armature winding of the AC rotating electric machine and terminal connection according to the third embodiment. For the sake of simplicity, the figure illustrates an example of a four pole motor with 36 slots, which is close to a minimal configuration. Moreover, a salient-pole synchronous machine illustrated in this case to show a relationship with a field system may instead be a cylindrical field synchronous machine or induction machine.

Figure 22:
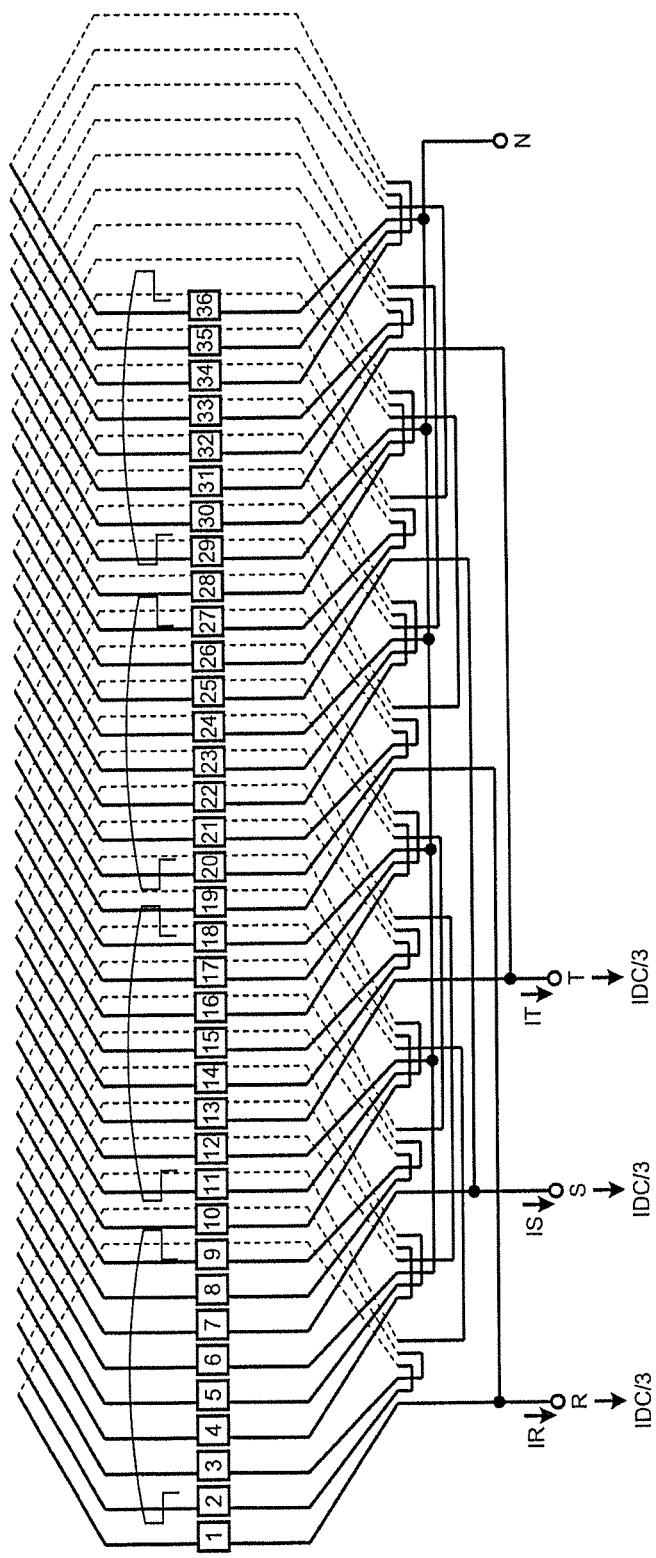
FIG. 22 is a diagram illustrating an armature winding of a conventional AC rotating electric machine (a double star-connected, 60-degree phase zone).

The winding and terminal configuration in FIG. 12 can be implemented simply by making a change to the coil ends of the windings and the terminal configuration illustrated in FIG. 22. FIG. 22 illustrates a double star connected four pole motor with a 60-degree phase zone configuration made up of a general double layer coil. The figure illustrates an example of three windings on the positive pole side and three windings on the negative pole side, which gives a total of six windings in each phase. The star connection is double paralleled by an interpolar crossover.

On the other hand, the winding of one set of three-phase terminals (RP, SP, TP) in FIG. 12 has two positive poles connected in series to provide a total of six windings. The winding of the other set of three-phase terminals (RN, SN, TN) has two negative poles connected in series to provide a total of six windings.

According to the embodiment in FIG. 12, the number of windings does not change before and after the alteration; therefore, the rated voltage can be maintained. Consequently, a device such as the breaker 906 can be used. When the embodiment illustrated in FIG. 11 is adopted as the DC power supply, the terminal voltage on the secondary side of the transformer 1002 does not change before and after the alteration; therefore, the transformer 1002 can be used.

The configuration illustrated in FIG. 9 enables operation bypassing the MMC converter. Specifically, the disconnectors 905P and 905N, the breaker 906, and the disconnectors 907A and 9078 are closed so as to allow the AC rotating electric machine 902A to be operated as a three-phase, double star-connected generator. When a Francis pump turbine is to be connected directly to the machine, the connection can be made such that the phase sequence follows the direction of power generation and thus the machine can perform a power generating operation by bypassing the MMC converter.

Figure 13:
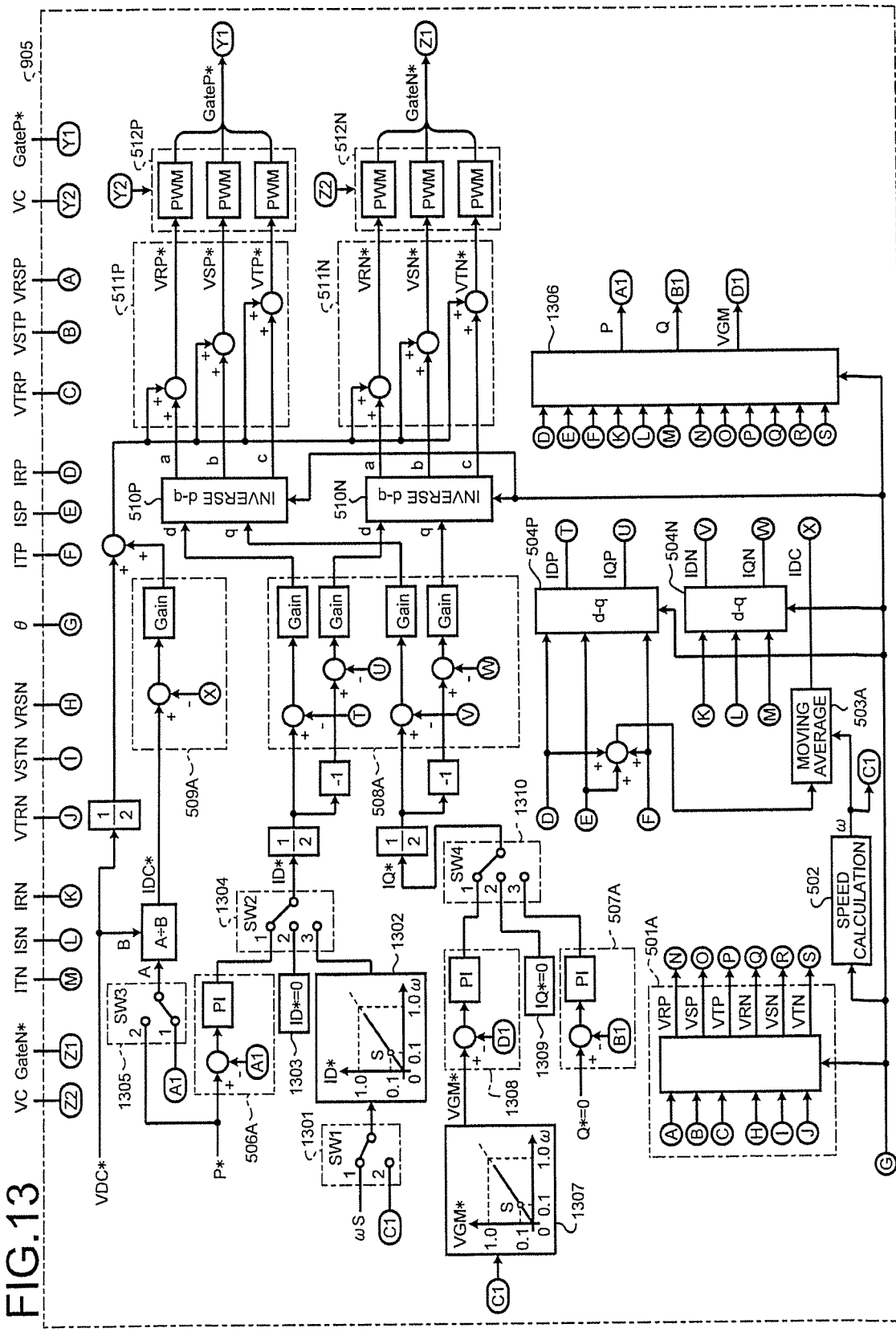
FIG. 13 is a control block diagram illustrating the third embodiment of the present invention.

FIG. 13 is a control block diagram of a control device 905 according to the third embodiment. Reference numerals identical to those assigned in FIG. 5 indicate identical components, which will not be described in order to avoid repetition.

A command switch (SW1) 1301 switches a command between a fixed starting frequency ωS and a rotational speed frequency co. A current command generator 1302 outputs a current command ID* proportional to the rotational speed frequency ω. A current command generator 1303 outputs ID*=0. A command switch (SW2) 1304 selectively performs switching among the active power adjustment unit 506A, the current command generator 1302, and the current command generator 1303 in order to output the current command ID*.

A command switch (SW3) 1305 selectively performs switching between an active power command P* and an active power measurement P. A power computing unit 1306 is configured such that the output of a line voltage effective value VGM of the AC rotating electric machine 902A is added to the power computing unit 505. A voltage command generator 1307 generates a voltage command VGM* proportional to the rotational speed frequency ω, a voltage adjustment unit 1308 is provided for the AC rotating electric machine 902A, and a current command generator 1309 outputs IQ*=0. A command switch (SW4) 1310 selectively performs switching among the voltage adjustment unit 1308, the current command generator 1309, and the reactive power adjustment unit 507A in order to output the current command IQ*.

Figure 14:
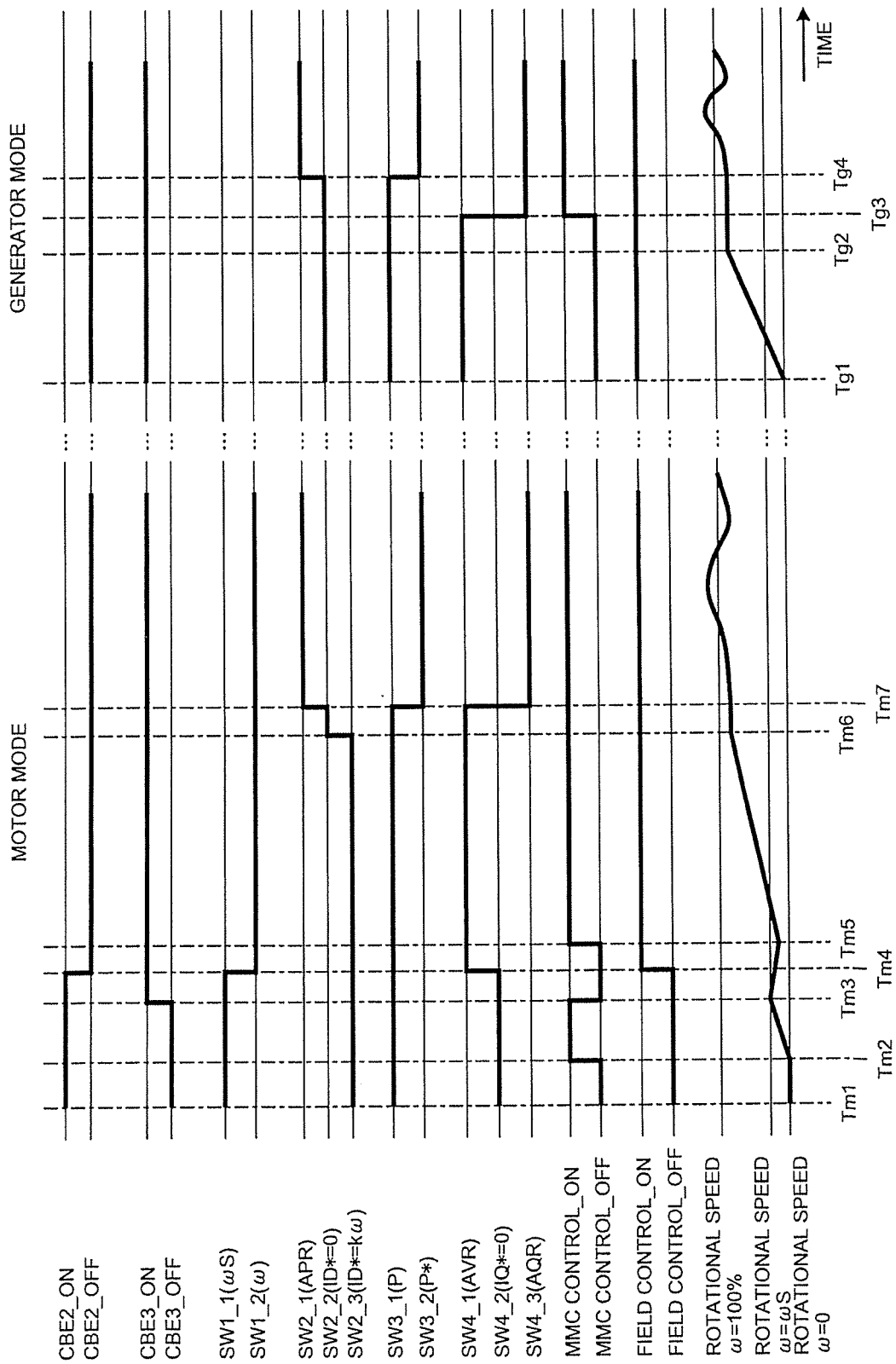
FIG. 14 is an operation sequence diagram illustrating the third embodiment of the present invention.

FIG. 14 illustrates a method of starting the AC generator-motor apparatus in the aforementioned embodiment illustrated in FIGS. 9 and 13.

First, a method of starting the machine in a motor mode will be described.

At time Tm1 in FIG. 14, the capacitors of the unit converters 103 are already charged in advance, the breaker 904 is closed, and the disconnectors 905P, 905N, 907A, and 907B are kept open.

A breaker CBE2 is closed (ON), a breaker CBE3 is open (OFF), the command switch SW1 is set to the fixed side of the constant speed command ωS, and the command switch SW2 is set to the side of an ID* command (ID*=kω) proportional to speed. The command switch SW3 is set to the side of the active power measurement P, and the command switch SW4 is set to IQ*=0.

When the MMC converter is started at time Tm2 in the aforementioned state (MMC control_ON), the AC rotating electric machine 902A is started in an induction machine mode by damper winding. The MMC converter is stopped temporarily (MMC control_OFF) when the rotational speed reaches a value equivalent to the set value ωS at time Tm3, at which time the CBE3 is closed so as to be connected to the field power converter 911. Then, at time Tm4, the CBE2 is opened so as to disconnect the resistor 913. At the same time, the command switch SW1 is switched to the side of the rotational speed frequency ω (rotational speed ω) and the command switch SW4 is switched to the output side (AVR) of the voltage adjustment unit 1308. This causes each of the ID* command and the IQ* command to output a command value proportional to the speed. At the same time, field control is started. When MMC converter control is started (MMC control_ON) at time Tm5 while maintaining the aforementioned state, the machine starts accelerating with synchronous machine torque. Once the rotational speed ω enters a range of variable speed operation, the output of the command switch SW2 is switched to ID*=0 temporarily at time Tm6, then at time Tm7, the command switch SW2 is set to the output side (APR) of the active power adjustment unit, the command switch SW3 is set to the side of the command P*, and the command switch SW4 is set to the output side (AQR) of the reactive power adjustment unit, thereby causing the machine to enter the operation in a normal variable speed motor mode.

According to the present embodiment described above, the machine can perform self-starting in the motor mode without depending on a starting device.

Next, a method of starting the machine in a generator mode will be described.

At Tg1 in FIG. 14, the capacitors 203 of the unit converters 103 are already charged in advance, the breaker 904 is closed, and the disconnectors 905P, 905N, 907A, and 907B are kept open.

The breaker CBE2 is open, the breaker CBE3 is closed, the command switch SW1 is not used (fixed to one side as the output is undetermined), and the command switch SW2 is set to the side of ID*=0. The command switch SW3 is set to the side of the active power measurement P, and the command switch SW4 is set to the output side of the voltage adjustment unit.

In the generator mode, the rotational speed is controlled by a speed governor of a motor directly connected to the AC rotating electric machine 902A so that the machine is started and accelerated with driving torque on the side of the motor.

In the aforementioned state, at Tg1, the machine accelerates while the speed is adjusted by the speed governor on the side of the motor. The AC rotating electric machine 902A remains unloaded. After the rotational speed reaches a variable speed range, a rotational speed command to the speed governor is kept constant at Tg2. At this point in time, a phase signal θ corresponds to a rotational phase; therefore, the phase of voltage induced in the terminal of the AC rotating electric machine 902A and the phase of the voltage command are in phase with each other. At Tg3, the MMC control is started while at the same time the command switch SW4 is switched to the side of the reactive power adjustment unit. Then at Tg4, the command switch SW2 is switched to the output side of the active power adjustment unit, and the command switch SW3 is switched to the side of the active power command P*, thereby causing the machine to enter the operation in a normal variable speed generator mode.

Fourth Embodiment

Figure 15:
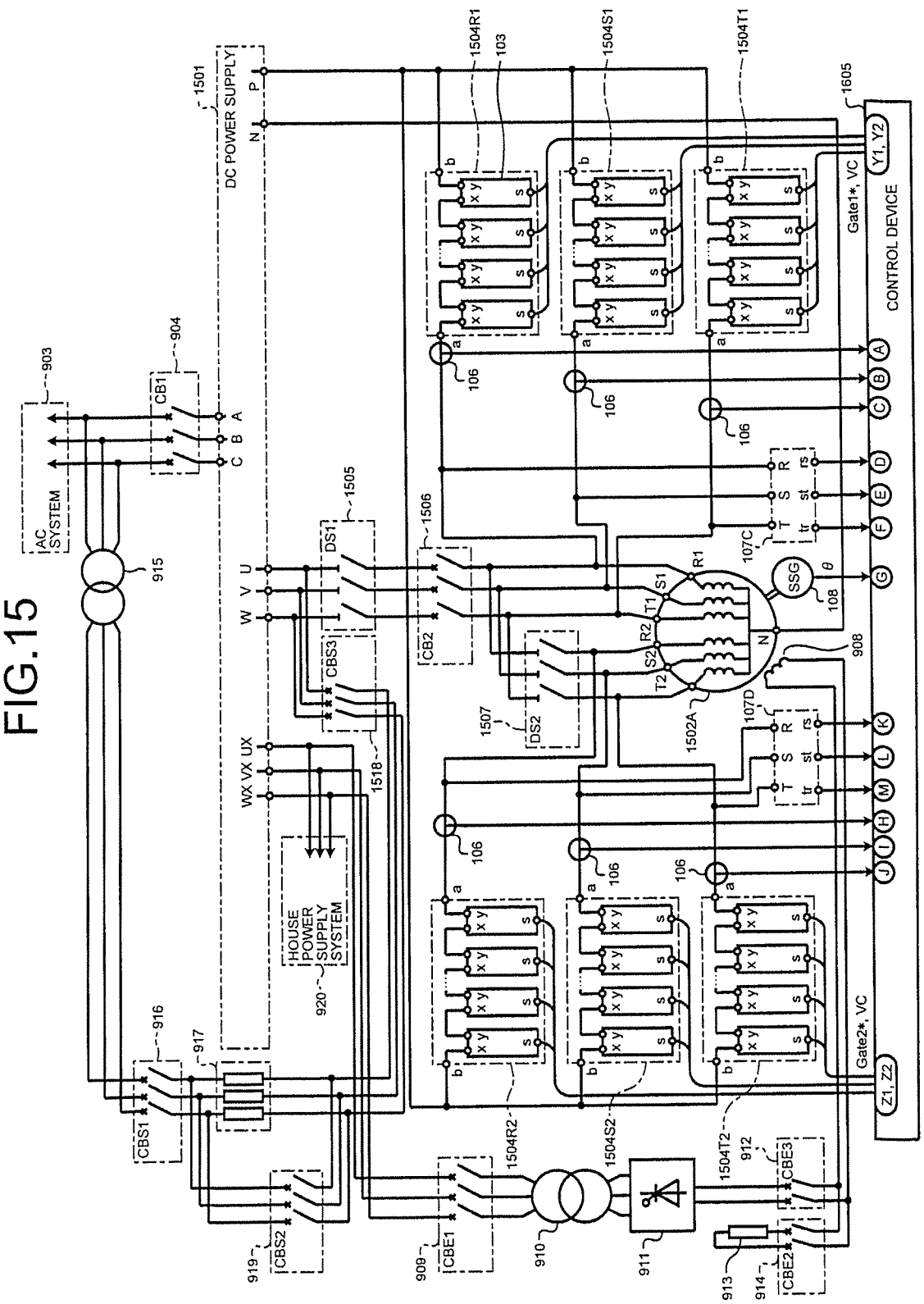
FIG. 15 is a circuit diagram illustrating a fourth embodiment of the present invention.

FIG. 15 is a circuit diagram illustrating a fourth embodiment of the present invention. Reference numerals identical to those assigned in FIGS. 6 and 9 indicate identical components. Such components will not be described in order to avoid repetition. Here, an AC rotating electric machine 1502A is a synchronous machine that includes a damper winding.

The AC rotating electric machine 1502A that includes two sets of star connections is provided with three-phase terminals (R1, S1, T1) and three-phase terminals (R2, S2, T2), where the neutral points of the two sets of star connections are bound together so as to be drawn out to the terminal N and connected to the second terminal (N) of a DC power supply 1501. There are six arms (1504R1, 1504S1, 1504T1, 1504R2, 1504S2, 1504T2), each of which includes two terminals (a, b) and is made up of N stages of serially connected output terminals (x, y) of the unit converters 103 of an MMC converter, where the terminals b of the three arms (1504R1, 1504S1, 1504T1) are star-connected to the first terminal (P) of the DC power supply 1501 and the terminals a of the arms are connected to the three-phase terminals (R1, S1, T1) of the AC rotating electric machine 1502A. The terminals b of the remaining three arms (1504R2, 1504S2, 1504T2) are star-connected to the first terminal (P) of the DC power supply 1501 and the terminals a of the arms are connected to the three-phase terminals (R2, S2, T2) of the AC rotating electric machine 1502A.

A control device 1605 receives a signal from each of the six DC current transformers 106, a DC voltage transformer 107C measuring the line voltage across the three-phase terminals (R1, S1, T1), a DC voltage transformer 107D measuring the line voltage across the three-phase terminals (R2, S2, T2), and the phase detector 108 measuring the rotational phase θ expressed in electrical degrees, and then performs a control operation to output gate signals (Gate1*, Gate2*) to the unit converters 103. A disconnector 1505 is closed during normal operation and open during maintenance. A disconnector 1507 is open during normal operation and closed during bypass operation.

The DC power supply 1501 performs power conversion between AC-system side terminals (A, B, C) and DC side terminals (P, N). The AC-system side terminals (A, B, C) are connected to the AC system 903 via the breaker 904.

The DC power supply 1501 further includes two sets of AC terminals (U, V, W) and (UX, VX, WX). The AC terminals (U, V, W) are branched at the disconnector 1507 via the disconnector 1505 and a breaker 1506 and then connected to the two sets of three-phase terminals (R1, S1, T1) and (R2, S2, T2) of the AC rotating electric machine. The AC terminals (UX, VX, WX) are branched into the house power supply system 920 and the field power converter 911 via the field circuit breaker 909 and the field transformer 910. The field winding 908 is switchably connected by the breaker 914 connected to the resistor 913 and the breaker 912 connected to the field power converter 911.

The AC system 903 is connected to the AC terminals (U, V, W) via the initial charging transformer 915, the initial charging breaker 916, the current limiting resistor 917, and an initial charge connection breaker 1518. The bypass circuit breaker 919 is provided for the current limiting resistor 917.

Figure 16:
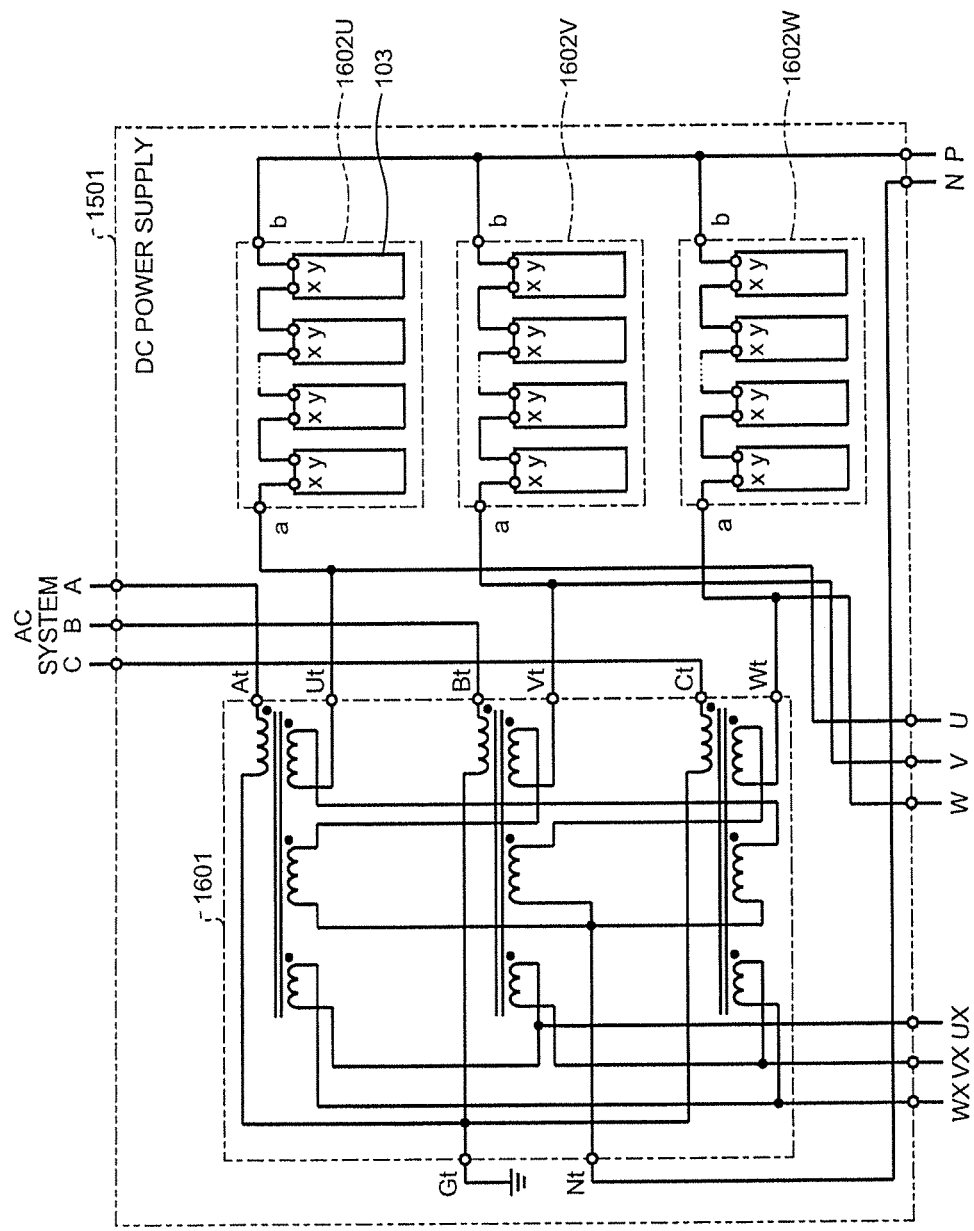
FIG. 16 is a circuit diagram of a DC power supply according to the fourth embodiment of the present invention.

FIG. 16 is a circuit diagram illustrating an embodiment of the DC power supply 1501 that uses the ZCMMC converter disclosed in Patent Literature 3.

The primary windings of a transformer 1601 are connected to AC-system side terminals (A, B, C), and the secondary and tertiary windings are zigzag connected so as to be connected to the AC terminals (U, V, W). The AC terminals (U, V, W) of the transformer 1601 are connected to the terminals a of three two-terminal arms (1602U, 1602V, 1602W) each made up of serially connected unit converters 103, and the terminals b of the arms are star-connected to the DC terminal (P). On the other hand, the neutral point of the zigzag connection is connected to the DC terminal (N). The transformer 1601 is provided with a delta-connected fourth winding that has a function of feeding power to a house power supply and a field circuit as well as a function of suppressing a third harmonic.

Figure 17:
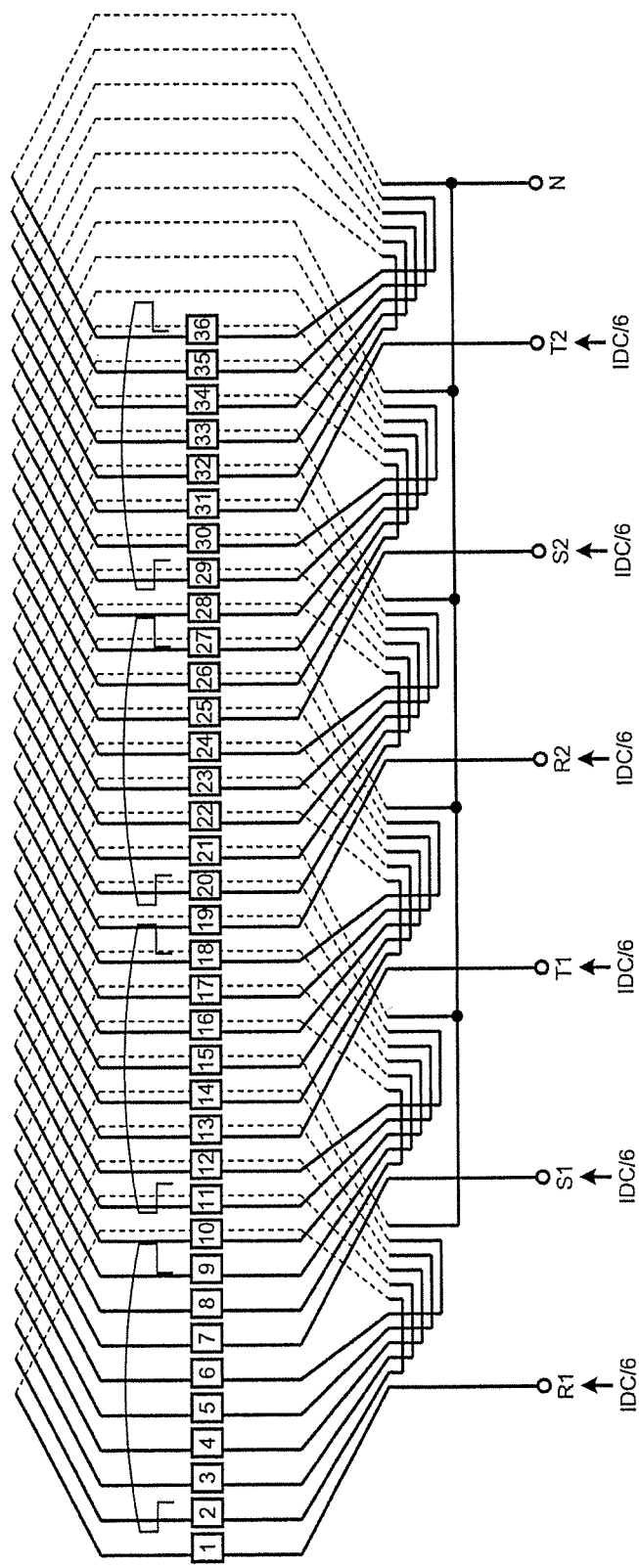
FIG. 17 is a diagram illustrating an armature winding of an AC rotating electric machine according to the fourth embodiment of the present invention.

FIG. 17 illustrates an example of an armature winding of the AC rotating electric machine and terminal connection according to the fourth embodiment. For the sake of simplicity, the figure illustrates an example of a four pole motor with 36 slots, which is close to a minimal configuration. Moreover, a salient-pole synchronous machine illustrated in this case to show a relationship with a field system may instead be a cylindrical field synchronous machine or induction machine.

Figure 23:
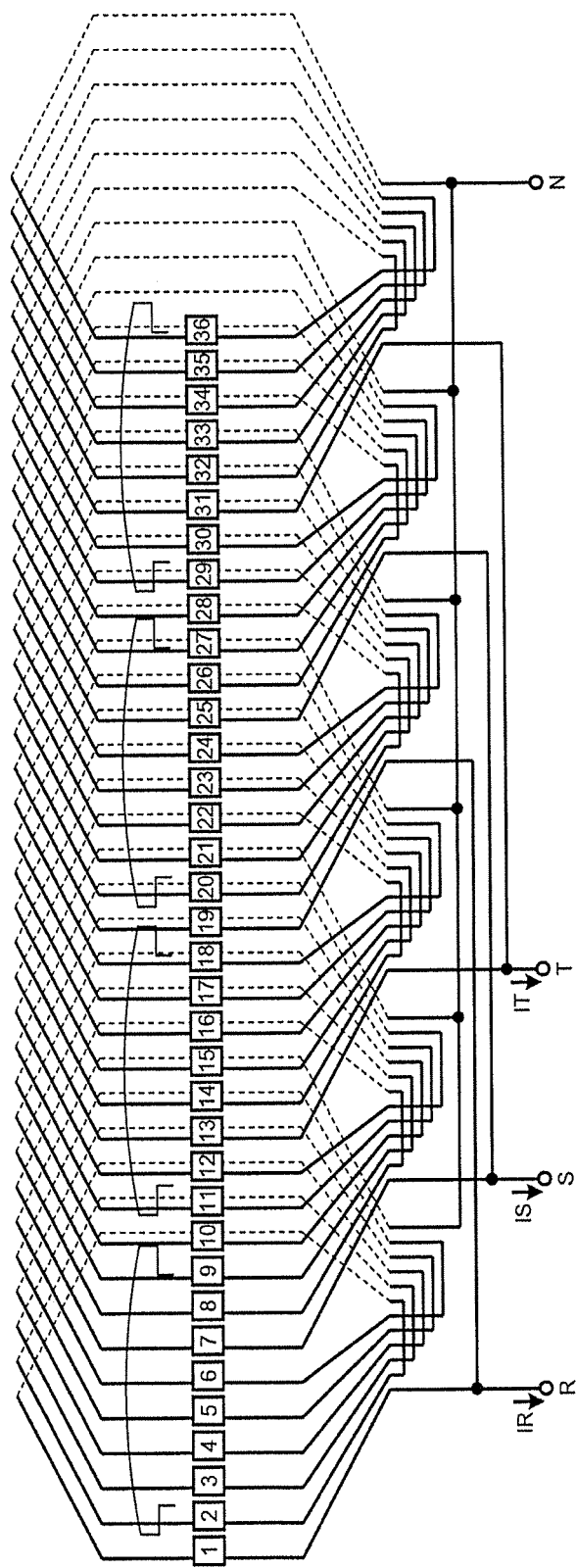
FIG. 23 is a diagram illustrating an armature winding of a conventional AC rotating electric machine (a double star-connected, 120-degree phase zone).

The winding and terminal configuration in FIG. 17 can be implemented simply by making a change to the coil ends of the windings and the terminal configuration illustrated in FIG. 23. FIG. 23 illustrates a double star connected four pole motor with a 120-degree phase zone configuration made up of a general double layer coil. The example illustrated in the figure has six windings for each phase. The star connection is double paralleled by an interpolar crossover.

On the other hand, in FIG. 17, the double star connection is divided into two sets to draw out independent terminals, where the number of windings of each of the first set of three-phase terminals (R1, S1, T1) and the second set of three-phase terminals (R2, S2, T2) is six in total as with FIG. 23.

According to the embodiment in FIG. 17, the number of windings does not change before and after the alteration; therefore, the rated voltage can be maintained. Consequently, a device such as the breaker 1506 can be used.

The configuration illustrated in FIG. 15 enables operation bypassing the MMC converter. Specifically, the disconnector 1505, the breaker 1506, and the disconnector 1507 are closed so as to allow the AC rotating electric machine 1502A to be operated as a three-phase, double star-connected generator. When a Francis pump turbine is to be connected directly to the machine, the connection can be made such that the phase sequence follows the direction of power generation and thus the machine can perform a power generating operation by bypassing the MMC converter.

According to the embodiment in FIG. 17, when the star connection is paralleled while increasing the current capacity of the AC rotating electric machine 1502A, the current flowing through each arm can be reduced by dividing the parallel winding into equal parts and drawing out the divided terminals. This allows the number of parallel connections of the switching devices in the unit converter 103 to be reduced; therefore, the configuration can be simplified and the reliability can be improved.

Figure 18:
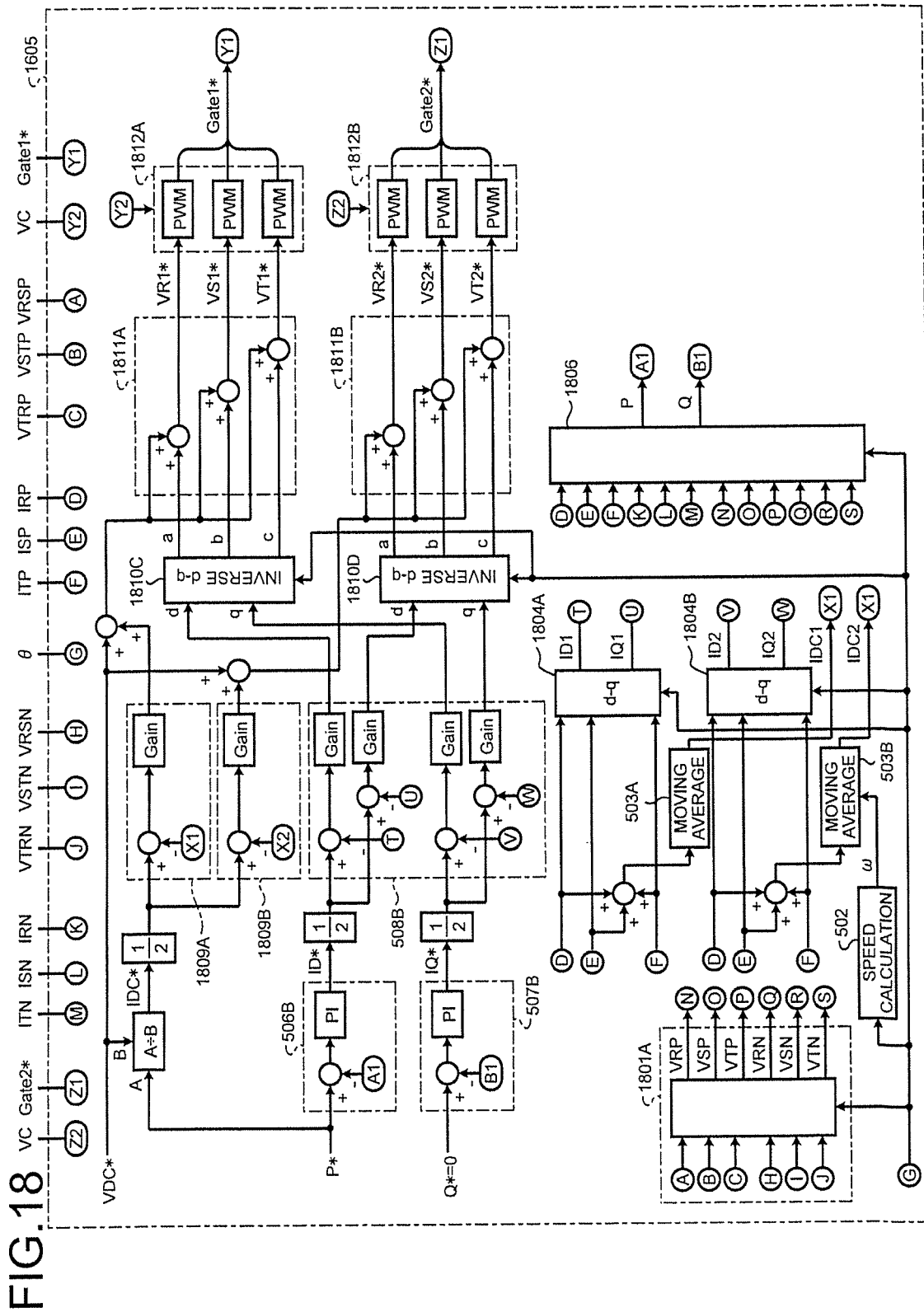
FIG. 18 is a control block diagram illustrating the fourth embodiment of the present invention.

FIG. 18 is a control block diagram of the control device 1605 according to the fourth embodiment. Reference numerals identical to those assigned in FIGS. 5 and 8 indicate identical components, which will not be described in order to avoid repetition.

A phase voltage computing unit 1801A calculates the phase voltage signal from a line voltage detection signal. The control device 1605 also includes the speed computing unit 502 and moving average computing units 503A and 503B that calculate direct currents IDC1 and IDC2 by finding the moving average of the sum of the two sets of three-phase alternating current (IR1, IS1, IT1) and (IR2, IS2, IT2) Np times. D-q converters 1804A and 1804B perform a calculation according to expression 4 to output (ID1, IQ1) and (ID2, IQ2), respectively. Note that the phase sequence is RST in this case.

A power computing unit 1806 employs an instantaneous symmetrical coordinate method to calculate the active power P and reactive power Q from a phase voltage signal and an alternating current signal.

The active power adjustment unit 506B and the reactive power adjustment unit 507B output current commands ID* and IQ* such that an active power command P* and a reactive power command Q* correspond with the calculated values P and Q, respectively. The alternating current adjustment unit 508B performs a control operation such that command values obtained by bisecting the current command ID* correspond with the measured/calculated values ID1 and IQ1, respectively, and performs a control operation such that command values obtained by bisecting the current command IQ* correspond with the measured/calculated values ID2 and IQ2, respectively. Out of direct current adjustment units 1809A and 1809B, the direct current adjustment unit 1809A performs a control operation such that command values obtained by bisecting a DC command IDC* that is obtained by dividing an output command value P* by an output voltage command VDC* of the DC power supply correspond with the measured/calculated value IDC1 and the direct current adjustment unit 1809B performs a control operation such that command values obtained by bisecting the DC command IDC* that is obtained by dividing the output command value P* by the output voltage command VDC* of the DC power supply correspond with the measured/calculated value IDC2.

In the present embodiment, the degree of freedom of a current path is six, where there are four integration calculators in the alternating current adjustment unit 508B and there are two integration calculators in the direct current adjustment unit. This means that there are six calculators altogether. Thus, all the integration calculators can independently keep the input deviation to zero. Each of inverse d-q converters 1810C and 1810D performs a calculation according to expression 3.

A DC voltage command correction computing unit 1811A is provided for the arms 1504R1, 1504S1, and 1504T1, and the computing unit outputs output voltage commands VR1*, VS1* and VT1*. A DC voltage command correction computing unit 1811B is provided for the arms 1504R2, 1504S2, and 1504T2, and the computing unit outputs output voltage commands VR2*, VS2*, and VT2*.

Accordingly, when the three-phase terminals (R1, S1, T1) and (R2, S2, T2) of the two sets of parallel windings of the AC rotating electric machine 1502A have equal phase voltages of (VR*, VS* VT*), the output voltage commands VR1* and VR2* for the arms 1504R1 and 1504R2 are given by $$VR1^* = +VR^* + (½) \times VDC \text{ and}$$

$$VR2^* = +VR^* + (½) \times VDC, \text{ respectively.}$$

PWM computing units 1812A and 1812B thus output gate commands Gate1* and Gate2* on the basis of those output voltage commands and the capacitor voltage VC of the unit converters 103.

Fifth Embodiment

Figure 19:
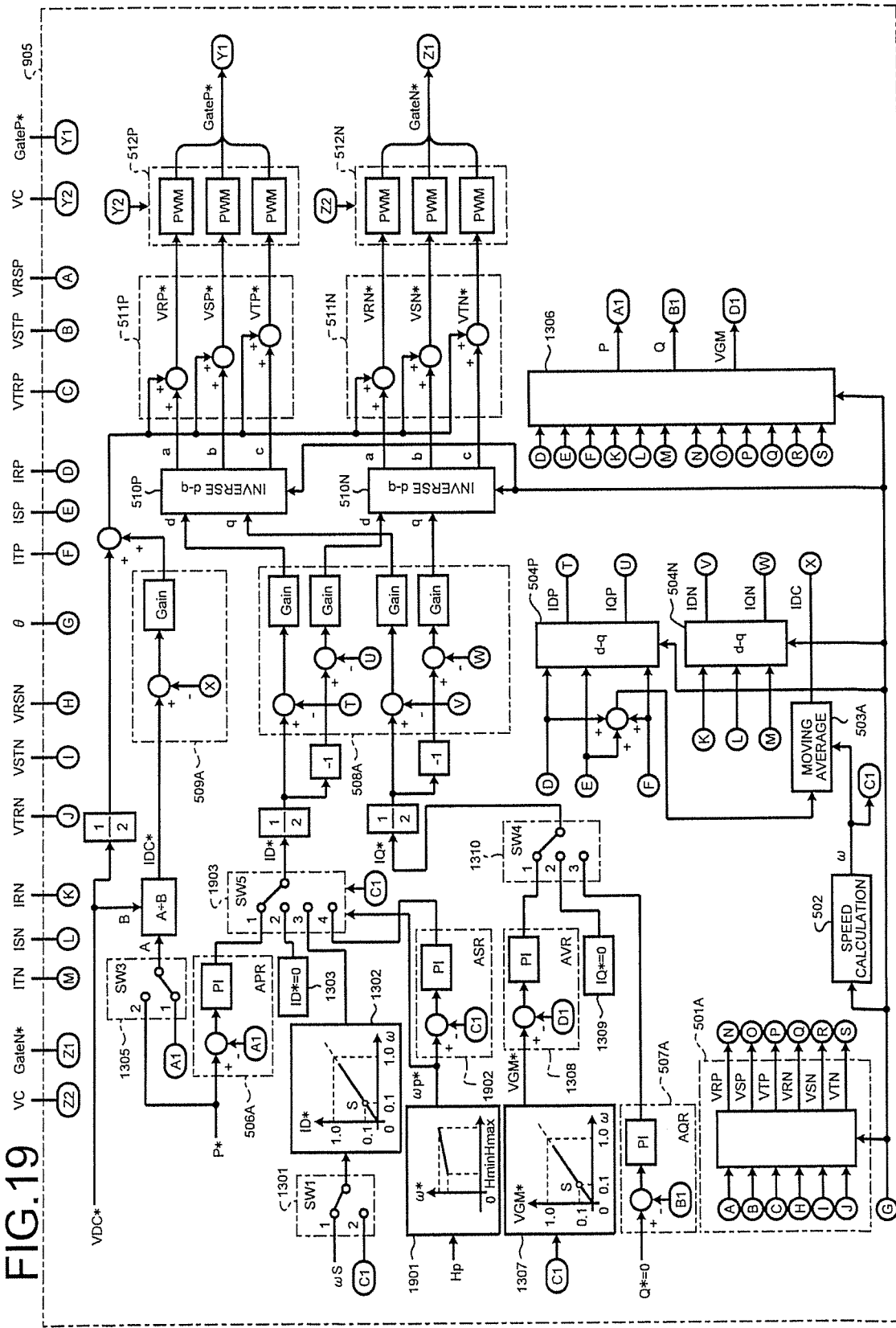
FIG. 19 is a control block diagram illustrating a fifth embodiment of the present invention.

FIG. 19 is a control block diagram of the control device 905 according to a fifth embodiment. Reference numerals identical to those assigned in FIG. 13 indicate identical components, which will not be described in order to avoid repetition.

In the present embodiment, a pump or a reversible pump turbine is directly connected to a synchronous machine 902A that includes a damper winding according to a system of the present invention, where a sealing valve is provided on the discharge side of the pump or the reversible pump turbine. A rotational speed command generator 1901 receives a total pump head signal Hp and outputs speed ωp at which input Pp at the time the water pressure is established corresponds with motor input Pm at the time of acceleration determined by the characteristics of the variable speed generator-motor system. The rotational speed command generator may be simplified as a command generator that outputs a fixed value when the range of fluctuation of the total pump head is small. A rotational speed adjustment unit 1902 adjusts a current command ID* such that the variation between a rotational speed command ωp* and a rotational speed frequency ω equals zero. A command switch (SW5) 1903 switches the current command ID* on the basis of the rotational speed command ωp* and the rotational speed frequency ω, which are criteria.

Figure 20:
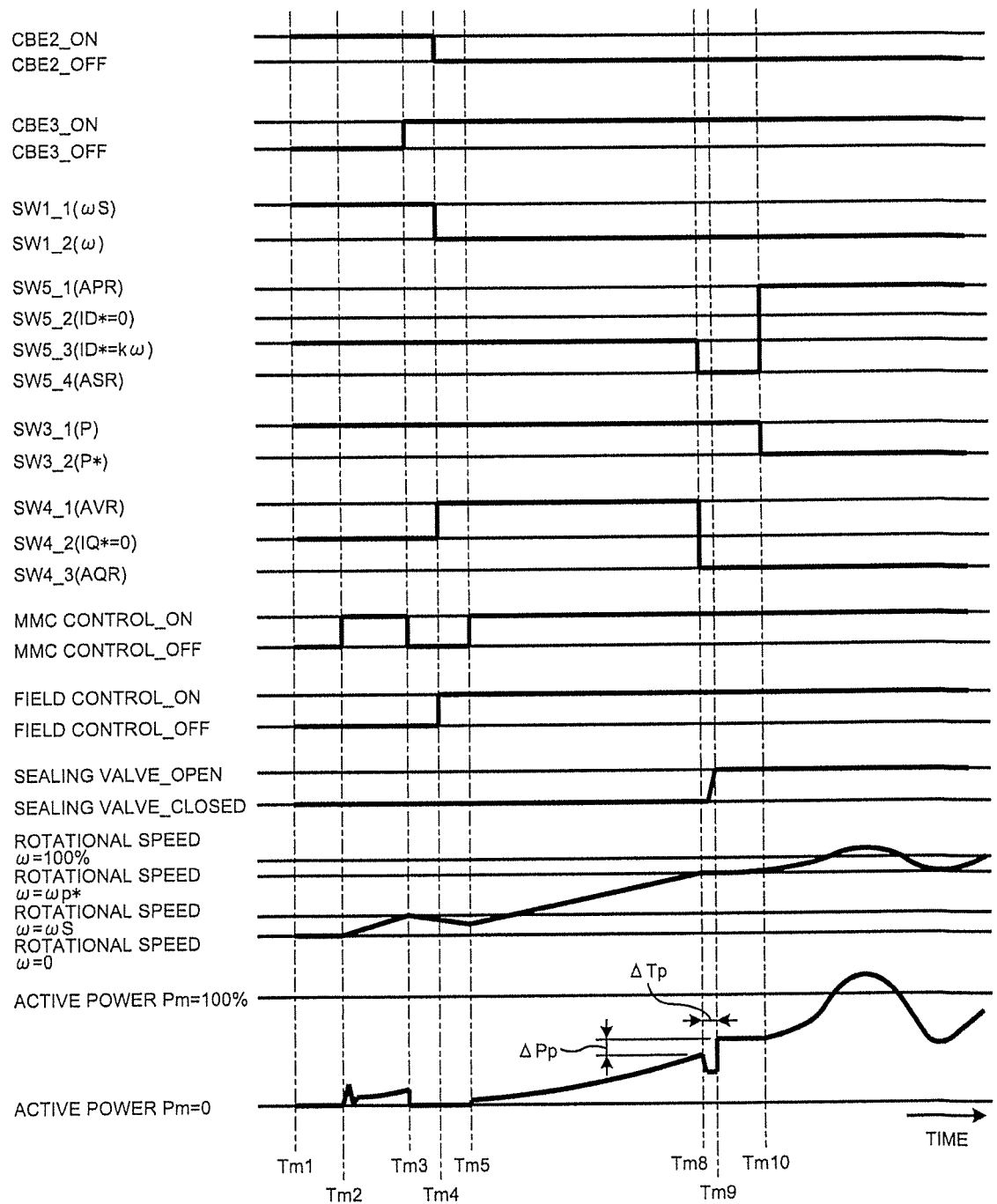
FIG. 20 is an operation sequence diagram illustrating the fifth embodiment of the present invention.

FIG. 20 illustrates a method of starting the AC generator-motor system in the aforementioned embodiments illustrated in FIGS. 9 and 19. Reference numerals identical to those assigned in FIG. 14 indicate identical components, which will not be described in order to avoid repetition.

When the MMC converter is started at time Tm2 (MMC control_ON), the AC rotating electric machine 902A is started in an induction machine mode by damper winding so that active power Pm starts increasing from zero. The MMC converter is stopped temporarily (MMC control_OFF) when the rotational speed ω reaches a value equivalent to a set value ωS at time Tm3, at which time the active power Pm returns to zero. A CBE3 is closed so as to be connected to the field power converter 911. Then at time Tm4, a CBE2 is opened so as to disconnect the resistor 913. At the same time, a command switch SW1 is switched to the side of the rotational speed frequency ω while a command switch SW4 is switched to the output side (AVR) of the voltage adjustment unit 1308. This causes each of the ID* command and the IQ* command to output a command value proportional to speed. Field control is started at the same time (field control_ON). When MMC converter control is started (MMC control_ON) at time Tm5 while maintaining the aforementioned state, the machine starts accelerating with synchronous machine torque. Voltage and current in this period are both proportional to the rotational speed ω, so that the motor input Pm increases in proportion to the square of the rotational speed ω. On the other hand, the input Pp at the time the water pressure is established increases gradually in accordance with the rotational speed ω but to a lesser degree than the change in the motor input Pm; therefore, there certainly exists the rotational speed ω at which the two correspond with each other. While this value varies according to the range of the total pump head or the specific rate of turbomachinery, the value falls between 50% and 90% empirically when the rotational speed at rated input equals 100%. The rotational speed command generator 1901 calculates this value to be output as the rotational speed command ωp*. Once the rotational speed w accelerates up to the command value ωp*, at time Tm8, the current command ID* output from the command switch SW5 is switched to the output (ASR) of the rotational speed adjustment unit 1902 while at the same time the command switch SW4 is switched to the side of the output (AQR) of the reactive power adjustment unit 507A. The motor input Pm is reduced temporarily at time Tm8 in order to stop acceleration but, once the sealing valve is opened so as to establish the water pressure (sealing valve_open) at time Tm9, the motor input Pm increases again in response to a sudden increase in the pump or pump turbine input Pp. In order to prevent the fluctuation of the motor input Pm during this period, a timing to open the sealing valve may be adjusted such that a time difference ΔTp between time Tm9 and time Tm8 is as small as possible to increase the accuracy of the rotational speed command generator 1901 and reduce ΔPp. When the fluctuation in the rotational speed at the establishment of the water pressure is settled by the rotational speed adjustment unit 1902, at time Tm10, the command switch SW5 switches the current command ID* to the output (APR) of the active power adjustment unit while the command switch SW3 is switched to the side of the command P*, whereby the machine enters operation in a normal variable speed motor mode.

According to the present embodiment, a water level depressing device is not required as the starting torque can be ensured, whereby the pump or pump turbine filled with water can accelerate from rest to be able to cut down the starting time. Acceleration time can also be cut down because the machine can be operated with the upper limit of output current capacity of the unit converters 103 during the acceleration period. Moreover, the fluctuation of the motor input at the establishment of the water pressure can be minimized; therefore, a load adjustment or the like of the AC system required in a conventional pump is not required; therefore, a flexible operation can be implemented.

While the three-phase AC rotating electric machine has been described as an example in the aforementioned embodiments, it is needless to say that the embodiments of the present invention can be used also for an N-phase AC rotating electric machine. Moreover, while lap winding has been described as an example of the winding method in the aforementioned embodiments, it is needless to say that each embodiment of the present invention can be used also for wave winding.

REFERENCE SIGNS LIST 101A, 901, 901A, 901B, 1501 DC power supply
102A, 102B, 902A, 1502A AC rotating electric machine
903 AC system
904, 906, 912, 914, 1506 breaker
1001, 1002, 1601 transformer
1003 three-terminal reactor
920 house power supply system
908 field winding
909 field circuit breaker
910 field transformer
911 field power converter
913 resistor
917 current limiting resistor
915 initial charging transformer
916 initial charging breaker
918, 1518 initial charge connection breaker
919 bypass circuit breaker
109A, 109B, 609, 905P, 905N, 907A, 907B, 1505, 1507 disconnector
104RP, 104SP, 104TP, 104RN, 104SN, 104TN, 604R, 604S, 604T, 1004UP, 1004VP, 1004WP, 1004UM, 1004VM, 1004WM, 1504R1, 1504S1, 1504T1, 1504R2, 1504S2, 1504T2, 1602U, 1602V, 1602W arm
106 DC current transformer 107A, 107B, 107C, 107D, 208, 607, 507A, 507B DC voltage transformer
103 unit converter
201, 202, 212, 213, 214, 215 switching device
105A, 605A, 905, 1605 control device
203 capacitor
204A, 204B optical fiber cable
205A, 205B photoelectric conversion element
206A serial-parallel conversion circuit
207A gate driver
209 analog-digital converter
210 parallel-serial converter
211 electro-optical conversion element
501A, 501B, 1801A phase voltage computing unit
502 speed computing unit
503A, 503B moving average computing unit
504P, 504N, 504C, 1804A, 1804B d-q converter
505A, 505B, 1306, 1806 power computing unit
506A, 506B active power adjustment unit
507A, 507B reactive power adjustment unit
508A, 508B alternating current adjustment unit
509A, 509B, 1809A, 1809B direct current adjustment unit
510P, 510N, 510C, 1810C, 1810D inverse d-q converter
511P, 511N, 511C, 1811A, 1811B DC voltage command correction computing unit
512P, 512N, 512C, 1812A, 1812B PWM computing unit
1301, 1304, 1305, 1310, 1903 command switch
1302, 1303, 1309 current command generator
1307 voltage command generator
1308 voltage adjustment unit
1901 rotational speed command generator
1902 rotational speed adjustment unit

The invention claimed is:

1. A variable speed generator-motor system comprising a power converter connected to a DC power supply and a three phase synchronous machine having damper windings and connected to an AC side via three terminals,
   wherein three terminals are connected to neutral points of three sets of three-terminal reactors,
   terminals of the three-terminal reactors are connected to terminals of three two-terminal arms that are formed by serially connected k (where k is a natural number equal to one or larger) two-terminal unit converters that are able to output an arbitrary voltage via an energy storage element having voltage source characteristic, and
   terminals of the arms are star-connected to DC terminal,
   terminals of the three-terminal reactors are connected to the terminals of three two-terminal arms that are formed by serially connected unit converters, and
   the terminals of the arms are star-connected to DC terminal, the variable speed generator-motor system includes:
   a first controller to adjust a frequency and an amplitude of current supplied from the power converter to the synchronous machine to a fixed value;
   a second controller to synchronize a frequency of current supplied from the power converter to the synchronous machine with a rotational speed of the synchronous machine and adjust an amplitude of the current to a value proportional to the frequency;
   and
   a switch to short-circuit a field winding of the synchronous machine with a resistor when the first controller is used,
   and
   connect the field winding of the synchronous machine to an exciter when the second controller is used,
   and
   the variable speed generator-motor system uses the first controller when the synchronous machine is started from rest, and switches control to be performed by the second controller once the frequency reaches a set value,
   wherein a pump or a reversible pump turbine is provided with a sealing valve on a discharge side and is directly connected to the synchronous machine having the damper winding,
   the variable speed generator-motor system includes a third controller to generate a rotational speed command in response to a pump head signal of the pump or the reversible pump turbine,
   and
   adjust the rotational speed to the rotational speed command,
   and
   the variable speed generator-motor system opens the sealing valve when the second controller detects acceleration for the rotational speed command,
   and
   then switches control to be performed by the third controller.

* * * * *